(12) United States Patent
Nam et al.

(10) Patent No.: US 11,234,272 B2
(45) Date of Patent: Jan. 25, 2022

(54) DOWNLINK TRAFFIC QUERY FOR UNLICENSED BAND OPERATION

(71) Applicant: QUALCOMM Incorporated, San Diego, CA (US)

(72) Inventors: Wooseok Nam, San Diego, CA (US); Tao Luo, San Diego, CA (US); Srinivas Yerramalli, San Diego, CA (US); Xiaoxia Zhang, San Diego, CA (US); Jing Sun, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 103 days.

(21) Appl. No.: 16/691,074

(22) Filed: Nov. 21, 2019

(65) Prior Publication Data

US 2020/0205198 A1 Jun. 25, 2020

Related U.S. Application Data

(60) Provisional application No. 62/784,340, filed on Dec. 21, 2018.

(51) Int. Cl.
*H04W 74/08* (2009.01)
*H04W 72/04* (2009.01)
(Continued)

(52) U.S. Cl.
CPC ....... *H04W 74/0816* (2013.01); *H04L 5/0048* (2013.01); *H04L 5/0053* (2013.01);
(Continued)

(58) Field of Classification Search
CPC ... H04W 28/04; H04W 72/04; H04W 72/042; H04W 88/08; H04L 5/0007
(Continued)

(56) References Cited

U.S. PATENT DOCUMENTS

| | | | |
|---|---|---|---|
| 10,420,144 B2 * | 9/2019 | Kusashima | H04W 16/14 |
| 2012/0014371 A1 * | 1/2012 | Weng | H04J 3/0682 |
| | | | 370/350 |

(Continued)

FOREIGN PATENT DOCUMENTS

| | | | |
|---|---|---|---|
| JP | WO 2020/006768 A1 * | 1/2020 | ............ H04W 72/04 |
| WO | WO-2020006768 A1 | 1/2020 | |

OTHER PUBLICATIONS

International Search Report and Written Opinion—PCT/US2019/062831—ISA/EPO—dated Feb. 27, 2020.

*Primary Examiner* — Pankaj Kumar
*Assistant Examiner* — Sanjay K Dewan
(74) *Attorney, Agent, or Firm* — Liem T. Do

(57) ABSTRACT

Methods, systems, and devices for wireless communications are described. A user equipment (UE) may transmit a downlink traffic query to a base station based at least in part on an expectation of downlink traffic from the base station over an unlicensed frequency spectrum band and an absence of downlink traffic from the base station over the unlicensed frequency spectrum band for a threshold duration of time. The UE may receive a downlink traffic indication response from the base station based at least in part on the downlink traffic query. The UE may monitor the unlicensed frequency spectrum band based at least in part on the downlink traffic indication response.

30 Claims, 15 Drawing Sheets

(51) Int. Cl.
    *H04W 16/14*     (2009.01)
    *H04W 74/00*     (2009.01)
    *H04L 5/00*      (2006.01)

(52) U.S. Cl.
    CPC ......... *H04W 16/14* (2013.01); *H04W 72/042* (2013.01); *H04W 72/0446* (2013.01); *H04W 74/006* (2013.01)

(58) Field of Classification Search
    USPC ....................................................... 370/329
    See application file for complete search history.

(56) References Cited

U.S. PATENT DOCUMENTS

| | | | |
|---|---|---|---|
| 2015/0055577 A1* | 2/2015 | Han | H04L 1/1685 370/329 |
| 2016/0029357 A1* | 1/2016 | Lv | H04L 5/0055 370/235 |
| 2016/0043843 A1* | 2/2016 | Liu | H04L 5/0048 370/329 |
| 2017/0013470 A1* | 1/2017 | Sun | H04W 16/14 |
| 2018/0115904 A1* | 4/2018 | Harada | H04L 27/0006 |
| 2019/0029047 A1* | 1/2019 | Zhu | H04W 74/0816 |
| 2019/0150201 A1* | 5/2019 | Dinan | H04W 76/27 370/329 |
| 2019/0159255 A1* | 5/2019 | Zheng | H04W 72/042 |
| 2019/0349991 A1* | 11/2019 | Mukherjee | H04W 72/0406 |
| 2020/0053779 A1* | 2/2020 | Jeon | H04L 1/0026 |

\* cited by examiner

DOWNLINK TRAFFIC QUERY FOR UNLICENSED BAND OPERATION

CROSS REFERENCE

The present application for patent claims the benefit of U.S. Provisional Patent Application No. 62/784,340 by NAM et al., entitled "DOWNLINK TRAFFIC QUERY FOR UNLICENSED BAND OPERATION," filed Dec. 21, 2018, assigned to the assignee hereof, and expressly incorporated herein.

BACKGROUND

The following relates generally to wireless communications, and more specifically to downlink traffic query for unlicensed band operation.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as a user equipment (UE). The wireless multiple-access communications system may employ technologies that support licensed frequency spectrum band operation and unlicensed frequency spectrum band operation for the base stations, network access nodes, or UEs.

SUMMARY

The described techniques relate to improved methods, systems, devices, and apparatuses that support downlink traffic querying for unlicensed or shared band operation. A communication device, which may be otherwise known as a user equipment (UE), may operate within an unlicensed frequency spectrum band in a wireless communications system. In some examples, when operating within an unlicensed frequency spectrum band, communications for the communication device may be subject to a transmission opportunity. Within the transmission opportunity, operating behaviors of the communication device may be similar to licensed frequency spectrum band operation. Outside the transmission opportunity, however, the communication device may monitor a communication channel to detect a transmission opportunity. In some examples, monitoring of the communication channel according to some techniques may result in inefficient use of resources. To improve efficiency of the monitoring of the communication channel and minimize use of resources of the communication device, it may be beneficial for the communication device to actively query the base station as to whether there is downlink traffic scheduled for the UE.

A method of wireless communications at a UE is described. The method may include transmitting a downlink traffic query to a base station based on an expectation of downlink traffic from the base station over an unlicensed frequency spectrum band and an absence of downlink traffic from the base station over the unlicensed frequency spectrum band for a threshold duration of time, receiving a downlink traffic indication response from the base station based on the downlink traffic query, and monitoring the unlicensed frequency spectrum band based on the downlink traffic indication response.

An apparatus for wireless communications at a UE is described. The apparatus may include a processor, memory in electronic communication with the processor, and instructions stored in the memory. The instructions may be executable by the processor to cause the apparatus to transmit a downlink traffic query to a base station based on an expectation of downlink traffic from the base station over an unlicensed frequency spectrum band and an absence of downlink traffic from the base station over the unlicensed frequency spectrum band for a threshold duration of time, receive a downlink traffic indication response from the base station based on the downlink traffic query, and monitor the unlicensed frequency spectrum band based on the downlink traffic indication response.

Another apparatus for wireless communications at a UE is described. The apparatus may include means for transmitting a downlink traffic query to a base station based on an expectation of downlink traffic from the base station over an unlicensed frequency spectrum band and an absence of downlink traffic from the base station over the unlicensed frequency spectrum band for a threshold duration of time, receiving a downlink traffic indication response from the base station based on the downlink traffic query, and monitoring the unlicensed frequency spectrum band based on the downlink traffic indication response.

A non-transitory computer-readable medium storing code for wireless communications at a UE is described. The code may include instructions executable by a processor to transmit a downlink traffic query to a base station based on an expectation of downlink traffic from the base station over an unlicensed frequency spectrum band and an absence of downlink traffic from the base station over the unlicensed frequency spectrum band for a threshold duration of time, receive a downlink traffic indication response from the base station based on the downlink traffic query, and monitor the unlicensed frequency spectrum band based on the downlink traffic indication response.

In some examples of the method, apparatuses, and non-transitory computer-readable medium described herein, monitoring the unlicensed frequency spectrum band may include operations, features, means, or instructions for identifying, based on the downlink traffic indication response, a downlink traffic schedule for the UE, and receiving downlink traffic from the base station according to the downlink traffic schedule.

In some examples of the method, apparatuses, and non-transitory computer-readable medium described herein, the downlink traffic schedule includes one or more of a downlink traffic state, a downlink traffic window, a downlink traffic duration, a data rate for downlink traffic, a scheduling grant for downlink traffic, or a combination thereof.

In some examples of the method, apparatuses, and non-transitory computer-readable medium described herein, monitoring the unlicensed frequency spectrum band may include operations, features, means, or instructions for transitioning to a sleep mode for a time duration based on the downlink traffic indication response from the base station, and transitioning to an active mode upon termination of the time duration to monitor the unlicensed frequency spectrum band.

In some examples of the method, apparatuses, and non-transitory computer-readable medium described herein, monitoring the unlicensed frequency spectrum band may include operations, features, means, or instructions for selecting one or more of a monitoring schedule, a monitoring duration, or a combination thereof, based on the downlink traffic indication response from the base station.

Some examples of the method, apparatuses, and non-transitory computer-readable medium described herein may further include operations, features, means, or instructions for performing a listen before talk (LBT) procedure on the unlicensed frequency spectrum band before transmitting the downlink traffic query to the base station, where the downlink traffic query may be transmitted based on a successful LBT procedure.

Some examples of the method, apparatuses, and non-transitory computer-readable medium described herein may further include operations, features, means, or instructions for transmitting, based on a successful LBT procedure, an indication of a shared portion of a channel occupancy time for a channel of the unlicensed frequency spectrum band, and receiving downlink traffic scheduled by the base station during the shared portion of the channel occupancy time.

Some examples of the method, apparatuses, and non-transitory computer-readable medium described herein may further include operations, features, means, or instructions for receiving a configuration signal identifying resources for transmitting the downlink traffic query, where the downlink traffic query may be transmitted using resources.

In some examples of the method, apparatuses, and non-transitory computer-readable medium described herein, the downlink traffic query may be transmitted in one or more of an autonomous uplink (AUL) transmission, an uplink control channel transmission, an uplink data channel transmission, an uplink reference signal transmission, a random access channel transmission, a scheduling request transmission, a timing adjustment request transmission, a radio resource control (RRC) transmission, a medium access control (MAC) control element (CE) transmission, or a combination thereof.

In some examples of the method, apparatuses, and non-transitory computer-readable medium described herein, the downlink traffic query may be transmitted over a licensed frequency spectrum band that may be different from the unlicensed frequency spectrum band.

In some examples of the method, apparatuses, and non-transitory computer-readable medium described herein, the downlink traffic query may be transmitted over a RAT that may be different from the RAT used for downlink traffic received over the unlicensed frequency spectrum band.

A method of wireless communications at a base station is described. The method may include receiving a downlink traffic query from a UE based on an expectation of downlink traffic from the base station over an unlicensed frequency spectrum band and an absence of downlink traffic from the base station over the unlicensed frequency spectrum band for a threshold duration of time and transmitting a downlink traffic indication response to the UE that includes an indication of a downlink traffic schedule for the UE.

An apparatus for wireless communications at a base station is described. The apparatus may include a processor, memory in electronic communication with the processor, and instructions stored in the memory. The instructions may be executable by the processor to cause the apparatus to receive a downlink traffic query from a UE based on an expectation of downlink traffic from the base station over an unlicensed frequency spectrum band and an absence of downlink traffic from the base station over the unlicensed frequency spectrum band for a threshold duration of time and transmit a downlink traffic indication response to the UE that includes an indication of a downlink traffic schedule for the UE.

Another apparatus for wireless communications at a base station is described. The apparatus may include means for receiving a downlink traffic query from a UE based on an expectation of downlink traffic from the base station over an unlicensed frequency spectrum band and an absence of downlink traffic from the base station over the unlicensed frequency spectrum band for a threshold duration of time and transmitting a downlink traffic indication response to the UE that includes an indication of a downlink traffic schedule for the UE.

A non-transitory computer-readable medium storing code for wireless communications at a base station is described. The code may include instructions executable by a processor to receive a downlink traffic query from a UE based on an expectation of downlink traffic from the base station over an unlicensed frequency spectrum band and an absence of downlink traffic from the base station over the unlicensed frequency spectrum band for a threshold duration of time and transmit a downlink traffic indication response to the UE that includes an indication of a downlink traffic schedule for the UE.

Some examples of the method, apparatuses, and non-transitory computer-readable medium described herein may further include operations, features, means, or instructions for receiving an indication from the UE of a shared portion of a channel occupancy time for a channel of the unlicensed frequency spectrum band, and transmitting downlink traffic to the UE during the shared portion of the channel occupancy time.

Some examples of the method, apparatuses, and non-transitory computer-readable medium described herein may further include operations, features, means, or instructions for performing a listen-before-talk procedure on the unlicensed frequency spectrum band before transmitting the downlink traffic indication response to the UE.

Some examples of the method, apparatuses, and non-transitory computer-readable medium described herein may further include operations, features, means, or instructions for transmitting a configuration signal identifying resources for transmitting the downlink traffic query, where the downlink traffic query may be received using resources.

In some examples of the method, apparatuses, and non-transitory computer-readable medium described herein, the downlink traffic query may be received in one or more of an AUL transmission, an uplink control channel transmission, an uplink data channel transmission, an uplink reference signal transmission, a random access channel transmission, a scheduling request transmission, a timing adjustment request transmission, an RRC transmission, a MAC CE transmission, or a combination thereof.

In some examples of the method, apparatuses, and non-transitory computer-readable medium described herein, the downlink traffic query may be received over a licensed frequency spectrum band that may be different from the unlicensed frequency spectrum band.

In some examples of the method, apparatuses, and non-transitory computer-readable medium described herein, the downlink traffic query may be received over a RAT that may be different from the RAT used for downlink traffic received over the unlicensed frequency spectrum band.

In some examples of the method, apparatuses, and non-transitory computer-readable medium described herein, the downlink traffic schedule includes one or more of a downlink traffic state, a downlink traffic window, a downlink traffic duration, a data rate for downlink traffic, a scheduling grant for downlink traffic, or a combination thereof.

DETAILED DESCRIPTION

Figure 1:
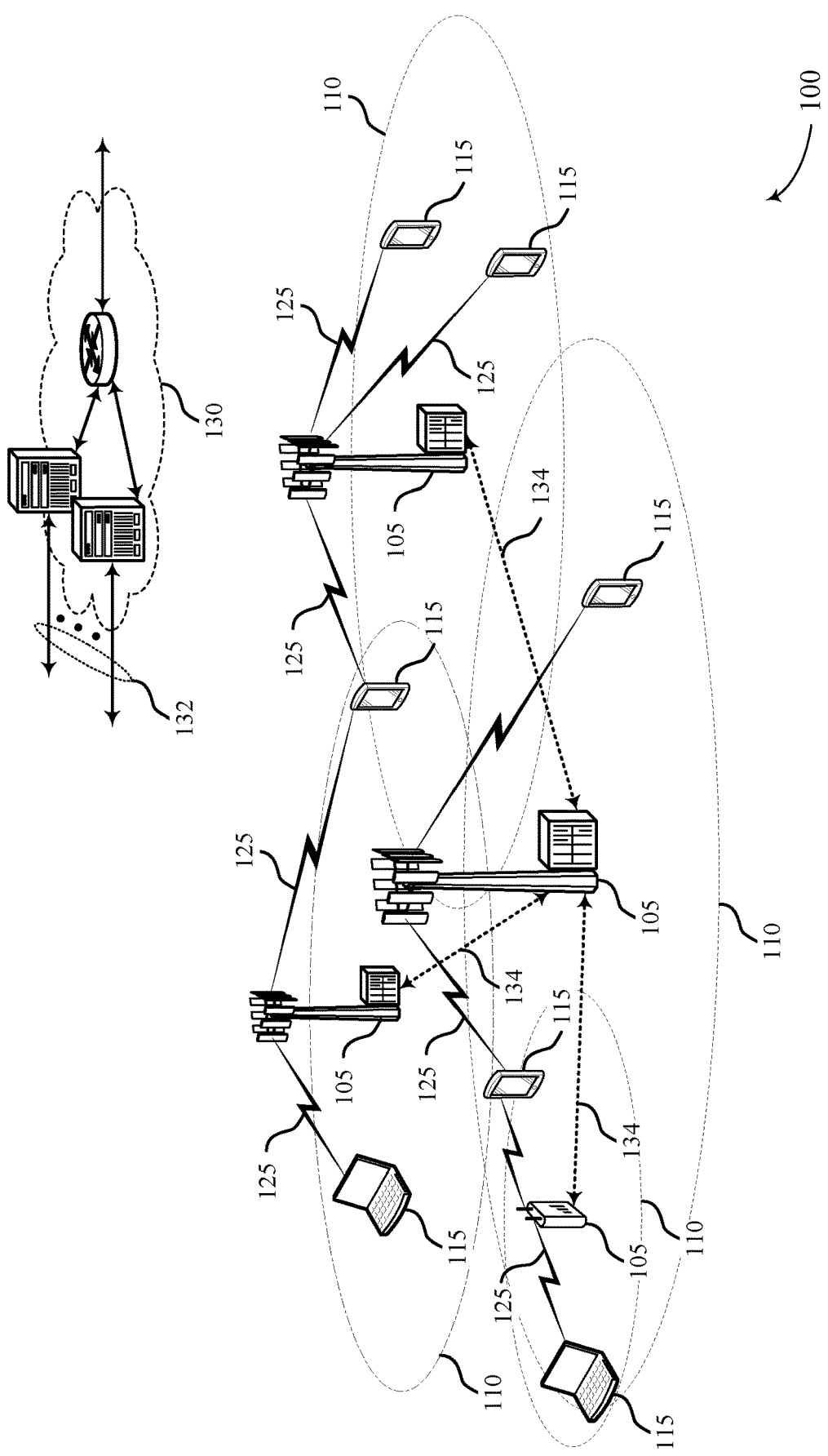
FIG. 1 illustrates an example of a system for wireless communications that supports downlink traffic querying for unlicensed or shared band operation in accordance with aspects of the present disclosure.

A wireless communications system may include a number of base stations supporting communication for multiple communication devices, which may be otherwise known as a user equipment (UE). In the wireless communications system, a base station and a UE may operate within an unlicensed frequency spectrum band. In the unlicensed frequency spectrum band, the base station may perform a contention-based scheme, such as listen-before-talk, on one or more channels to acquire at least one channel for wireless communications in the unlicensed frequency spectrum band. The UE may have a different unlicensed frequency spectrum band operation compared to a licensed frequency spectrum band operation. For example, when operating within an unlicensed frequency spectrum band, communications for the UE may depend on a transmission opportunity. A transmission opportunity may extend for a channel occupancy time, in which the UE may receive downlink communication from the base station or transmit uplink communication to the base station on an acquired channel (e.g., based on the listen-before-talk performed by the base station and/or UE).

Within the transmission opportunity, the operating behaviors of the UE may be similar (or same) to operating behaviors within a licensed frequency spectrum band. For example, the UE may transmit uplink communications (e.g., physical uplink control channel (PUCCH), physical uplink shared channel (PUSCH), references signals) or receive downlink communications (e.g., physical downlink control channel (PDCCH), reference signals, broadcast signal) as configured and scheduled. Unlike licensed frequency spectrum band operation, outside the transmission opportunity, the UE may keep monitoring (during initial signal monitoring occasions or channel activity monitoring windows) one or more channels continuously or at least occasionally (e.g., when in sleep mode to save power) to evaluate whether a transmission opportunity is available on at least one channel (e.g., an acquired channel) for wireless communications.

Although the UE's behavior of communicating during transmission opportunities supports reducing or avoiding interference between wireless communications systems sharing the unlicensed frequency spectrum band (e.g., interference between LTE/NR and Wi-Fi wireless communication systems), the UE's behavior for monitoring for the transmission opportunities may result in unnecessary power consumption. That is, a UE may remain in an active mode for extended lengths to monitor for a transmission opportunity, which may prevent the UE from going into a sleep mode. The reason the UE continues to monitor for the transmission opportunity indefinitely is because the transmission opportunity can start at any moment. That is, because the start of a transmission opportunity is opportunistic (contention-based), the UE may be unaware of when the transmission opportunity may start and when the UE may begin uplink transmission or downlink reception. As a result, present UE behavior for monitoring channels to identify transmission opportunities may be (based on UE implementation and) an inefficient use of UE resources (e.g., power consumption).

To improve efficiency of monitoring of a channel and decrease use of resources of a UE, it may be beneficial for the UE to monitor the channel (e.g., in unlicensed frequency spectrum band) only when there is downlink traffic being communicated from the base station. That is, instead of the UE monitoring the channel passively, the UE may proactively send a downlink traffic query to the base station to determine whether or not the UE should monitor the channel. Accordingly, the UE may transmit a downlink traffic query to the base station requesting information related to downlink traffic for the UE. In some aspects, the UE may transmit the downlink traffic query when the UE expects downlink traffic from the base station. For example, the UE may not receive downlink traffic from the base station for a time period, which may trigger transmission of the downlink traffic query. The base station may respond by transmitting an indication of a downlink traffic schedule to the UE in a downlink traffic indication response message. The UE may monitor the unlicensed frequency spectrum band and plan a next behavior based on the contents of the downlink traffic indication response from the base station. For example, the UE may monitor the channel when the response indicates that there is downlink traffic for the UE awaiting in the transmit buffer, but may transition to a sleep state (or tune away to a different channel/base station to perform other communication functions) when the response indicates there is no downlink traffic planned to be scheduled for the UE for a certain time duration. Accordingly, the UE may conserve power and/or time resources by proactively requesting a downlink traffic status update from the base station.

Particular aspects of the subject matter described herein may be implemented to realize one or more advantages. The described techniques may enable a device to improve efficiency of the monitoring of a communication channel and minimize use of resources of the device. It may also enable the device to actively query the base station as to whether there is downlink traffic scheduled for the device. The described techniques may enable the device to only monitor for downlink traffic during channel monitoring occasions and may enable the device to enter a sleep mode outside of the monitoring occasions, which may result in increased power savings. The described techniques may also promote efficient maintenance of quality of service requirements, resulting in improved user experience. As such, supported techniques may include improved network operations and, in some examples, may promote improved device and network efficiencies, among other benefits.

Aspects of the disclosure are further illustrated by and described with reference to apparatus diagrams, system diagrams, and flowcharts that relate to downlink traffic query for unlicensed or shared band operation.

FIG. 1 illustrates an example of a wireless communications system 100 that supports downlink traffic querying for unlicensed or shared band operation in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed or shared band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed or shared bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s = 1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may transmit a downlink traffic query to a base station 105 based at least in part on an expectation of downlink traffic from the base station 105 over an unlicensed frequency spectrum band and an absence of downlink traffic from the base station 105 over the unlicensed frequency spectrum band for a threshold duration of time. The UE 115 may receive a downlink traffic indication response from the base station 105 based at least in part on the downlink traffic query. The UE 115 may monitor the unlicensed frequency spectrum band based at least in part on the downlink traffic indication response.

In some aspects, a base station 105 may receive a downlink traffic query from a UE 115 based at least in part on an expectation of downlink traffic from the base station 105 over an unlicensed frequency spectrum band and an absence of downlink traffic from the base station 105 over the unlicensed frequency spectrum band for a threshold duration of time. The base station 105 may transmit a downlink traffic indication response to the UE 115 that comprises an indication of a downlink traffic schedule for the UE 115.

Figure 2:
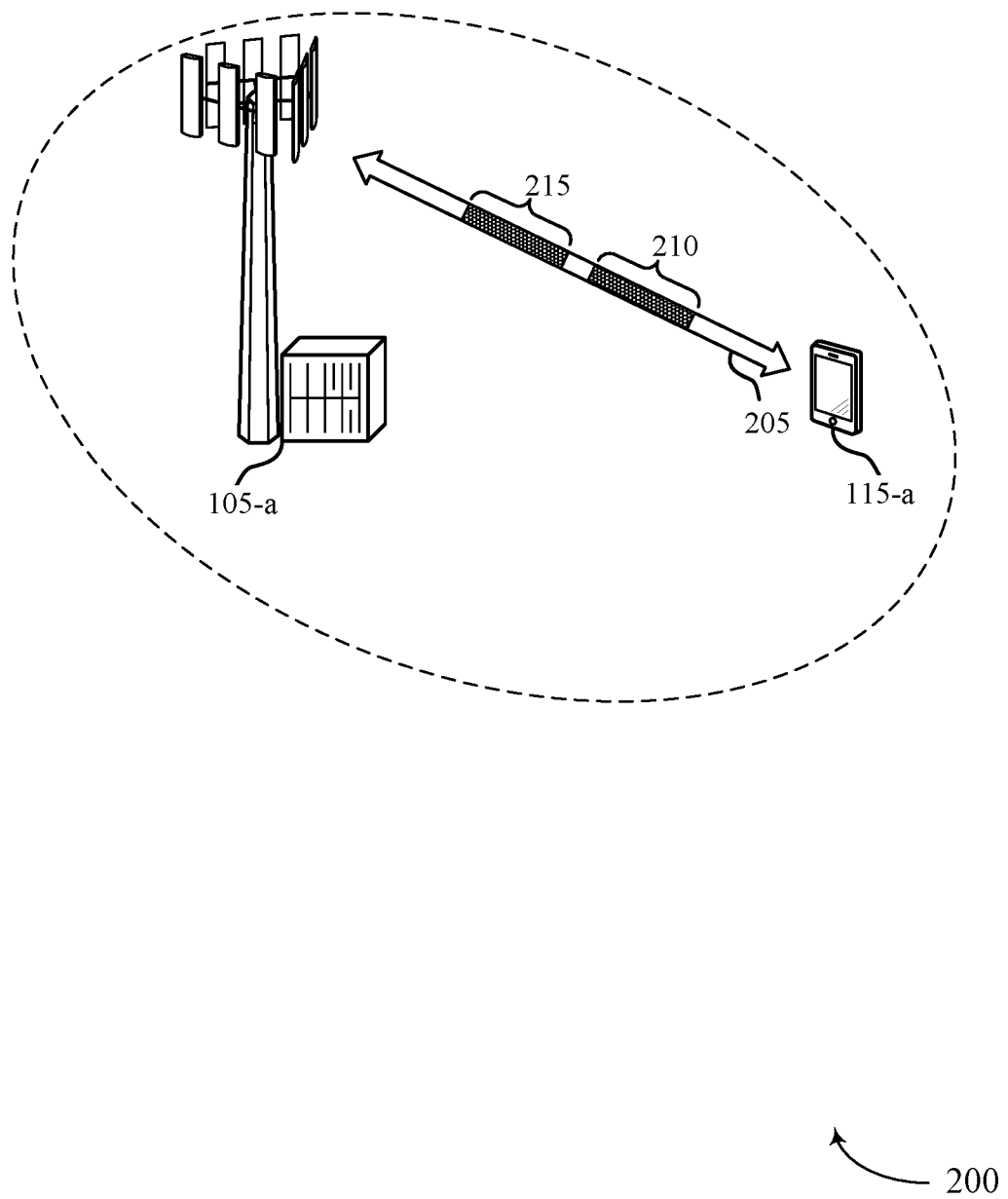
FIG. 2 illustrates an example of a wireless communication system that supports downlink traffic querying for unlicensed or shared band operation in accordance with aspects of the present disclosure.

FIG. 2 illustrates an example of a wireless communication system 200 that supports downlink traffic querying for unlicensed or shared band operation in accordance with aspects of the present disclosure. The wireless communication system 200 may include a base station 105-a and a UE 115-a, which may be examples of the corresponding devices described herein. In some examples, wireless communication system 200 may implement aspects of wireless communications system 100. For example, the base station 105-a and/or the UE 115-a may support improvements in channel monitoring for unlicensed frequency spectrum band.

The base station 105-a may perform a connection procedure (e.g., an RRC procedure, such as a cell acquisition procedure, a random access procedure, an RRC connection procedure, an RRC configuration procedure) with the UE 115-a. The base station 105-a and the UE 115-a may be configured with multiple antennas, which may be used for directional or beamformed transmissions. As part of the connection procedure, the base station 105-a and the UE 115-a may establish a communication link 205 for wired or wireless communication. In some aspects, the communication link 205 may be in an unlicensed frequency spectrum band.

In some aspects, base station 105-a and UE 115-a may perform wireless communications over a communication link 205 in an unlicensed frequency spectrum band. The wireless communications may include uplink and/or downlink communications. Conventionally, the wireless communications may use various channels established over a communication link 205. For example, a control channel (e.g., PDCCH) and a data channel (e.g., physical downlink shared channel (PDSCH) and/or PUSCH). Channels in an unlicensed frequency spectrum band may be acquired opportunistically, e.g., using a contention-based channel access procedure performed by the transmitting device. The operations in the unlicensed frequency spectrum band may be performed within a transmission opportunity, which may correspond to a channel occupancy time obtained based on the channel access procedure succeeding. In the unlicensed frequency spectrum band, the uplink and/or downlink traffic may only occur within the transmission opportunities. Such conventional techniques, however, are inefficient because the UE does not know when traffic will arrive, and therefore may be required to continuously monitor the channel without going to a sleep mode. Moreover, certain types of traffic benefit from periodic or contiguous transmissions (e.g., voice over internet protocol (VoIP), video streaming, and the like), which may not be guaranteed due to failure of the channel access procedure. Aspects of the described techniques address this situation (and others) and provide for a UE 115-a that may proactively send a query with respect to downlink traffic to base station 105-a.

For example, UE 115-a may detect an absence of downlink traffic from base station 105-a over the unlicensed spectrum band for a threshold duration of time. However, UE 115-a may have an expectation of downlink traffic from base station 105-a. For example, UE 115-a may be operating in a connected mode with base station 105-a and may proactively transmit or otherwise provide a downlink traffic query with respect to downlink traffic under certain conditions.

One condition may include the downlink traffic including UE-specific data, broadcast data, control message (e.g., a physical (PHY)/MAC or higher layer traffic), and the like. Such traffic may be expected, but not received, by UE 115-a within the threshold duration of time.

Another condition may include UE 115-*a* expecting data from base station 105-*a* within a certain time window. For example, a transmission control protocols (TCP)-IP retransmission timeout may be pending with UE 115-*a*, which may give rise to the expectation of data from base station 105-*a*. Another example may be based on the type of downlink traffic being communicated from base station 105-*a*. For example, traffic having a certain quality of service requirement (e.g., such as VoIP, video streaming, emergency traffic, high priority communications, and the like) may be expected within the threshold duration of time by UE 115-*a*.

Another condition may include UE 115-*a* receiving no downlink traffic from base station 105-*a* within a configurable threshold duration of time. For example, base station 105-*a* and/or UE 115-*a* may configure the threshold duration of time during connection establishment and/or via higher layer signaling (e.g., MAC CE, RRC signaling, and the like). UE 115-*a* may initiate a timer set to the configured threshold duration of time after receiving downlink traffic and determine an absence of expected downlink traffic from base station 105-*a* upon expiration of the timer. The downlink traffic may be UE-specific traffic, broadcast data, a control message (e.g., PHY/MAC or higher layer messaging), and the like. For example, the downlink traffic may include RRC reconfiguration message, MAC CE, and the like.

In some aspects, any of the above conditions may be combined and/or additional conditions may be considered when determining or otherwise identifying an absence of expected downlink traffic from base station 105-*a*.

Once UE 115-*a* determines that there is an expectation a downlink traffic, and an absence of downlink traffic from base station 105-*a*, for the threshold duration of time, UE 115-*a* may configure and transmit a downlink traffic query 210 to base station 105-*a*. Broadly, the downlink traffic query 210 may carry or convey a request for the status or schedule of downlink traffic from base station 105-*a*.

In some aspects, UE 115-*a* may configure the downlink traffic query 210 to carry or otherwise convey an indication of a request for downlink traffic scheduling or other traffic information from base station 105-*a*. For example, the downlink traffic query 210 may carry or otherwise convey a traffic identifier, such as a virtual channel identifier, a logical channel identifier, and the like. In some aspects, transmission opportunity sharing may be supported (as is discussed below), in which case the downlink traffic query 210 may carry or otherwise convey an indication of a shared portion of the transmission opportunity (or corresponding channel occupancy time) the base station 105-*a* can use for downlink traffic during the transmission opportunity.

UE 115-*a* may transmit or otherwise provide the downlink traffic query 210 to base station 105-*a* using a variety of techniques and/or protocols. Broadly, this may include UE 115-*a* using configured resources and/or performing a channel access procedure (e.g., an LBT procedure). For example, UE 115-*a* may be configured with dedicated resources that are used for transmitting the downlink traffic query 210 without performing an LBT procedure. One example of such a transmission may include, but is not limited to, an autonomous uplink (AUL) transmission. For example, base station 105-*a* may transmit or otherwise provide a configuration signal identifying resources that are used for transmitting the downlink traffic query 210.

In another example, UE 115-*a* may perform an LBT procedure on a channel in the unlicensed frequency spectrum band to acquire the channel for a transmission opportunity (e.g., corresponding to the channel occupancy time). In some aspects, this may support LBT diversity between UE 115-*a* and base station 105-*a*. For example, interference/contending conditions may be different between base station 105-*a* and UE 115-*a* (e.g., due to geographic separation). This may result in a high contention and high probability of LBT failure at base station 105-*a*, which may not be the case at UE 115-*a*. In some aspects, base station 105-*a* may also perform an LBT procedure and, since two nodes (e.g., base station 105-*a* and UE 115-*a*) participate in the contention-based access procedure, the chance of at least one node acquiring a transmission opportunity increases. Once at least one node acquires a transmission opportunity, the node can share the transmission opportunity with the other node.

In some aspects, transmission opportunity sharing may also be utilized. For example, once UE 115-*a* acquires transmission opportunity based on a successful LBT procedure, UE 115-*a* may share some of the transmission opportunity resources with base station 105-*a*. For example, UE 115-*a* may determine that the transmission opportunity contains more resources (e.g., time, frequency, and/or spatial resources) than is needed for transmitting the downlink traffic query 210. Accordingly, UE 115-*a* may configure the downlink traffic query 210 to identify the excess resources (e.g., the shared portion of the channel occupancy time) that can be used by base station 105-*a*.

In some aspects, UE 115-*a* may use various signaling methods for transmitting the downlink traffic query 210 to base station 105-*a*. Broadly, the signaling methods may use dedicated uplink channels/signals and/or may piggyback on other uplink transmissions. Examples of dedicated uplink channels/signals may include, but are not limited to, an uplink control channel transmission (e.g., PUCCH), an uplink data channel transmission (e.g., PUSCH), an uplink reference signal transmission (e.g., a sounding reference signal (SRS)), a random access channel transmission (e.g., a random access channel (RACH) transmission), and the like. Examples of piggybacking on another uplink transmission may include, but are not limited to, a scheduling request transmission, a timing adjustment request transmission, an RRC message or transmission, a MAC CE transmission, an uplink data transmission that uses configured resources (e.g., AUL resources), and the like.

In some aspects, UE 115-*a* may transmit or otherwise provide the downlink traffic query 210 over the unlicensed frequency spectrum band and/or may use a licensed frequency spectrum band to provide the downlink traffic query 210. In some aspects, UE 115-*a* may transmit or otherwise provide the downlink traffic query 210 using the same radio access technology (RAT) as is used for the downlink traffic, or may use a different RAT, e.g., a 5G/NR RAT may be used for the downlink traffic whereas an LTE or Wi-Fi RAT may be used for the downlink traffic query 210, or vice versa. In some aspects, UE 115-*a* may transmit or otherwise provide the downlink traffic query 210 using a different beamforming configuration than is used for the downlink traffic. For example, the downlink traffic may utilize beamformed transmissions (e.g., in a mmW network) whereas a non-beamformed transmission (e.g., a sub-6 GHz network) may be used for the downlink traffic query 210, or vice versa.

Base station 105-*a* may receive the downlink traffic query 210 from UE 115-*a* and identify or otherwise determine the downlink traffic schedule for UE 115-*a*. Broadly, the downlink traffic schedule may include, but is not limited to, a downlink traffic state (e.g., active/inactive), a downlink traffic window (e.g., expected transmission window(s)), the downlink traffic duration (e.g., an expected active/inactive duration), a data rate for downlink traffic, a scheduling grant for a downlink traffic, and the like. Accordingly, base station 105-*a* may transmit or otherwise provide a downlink traffic indication response 215 to UE 115-*a* that carries or otherwise conveys an indication of the downlink traffic schedule for UE 115-*a*.

In some aspects, base station 105-*a* may use configured resources for transmitting the downlink traffic indication response 215. In the event that transmission opportunity sharing is used (e.g., base station 105-*a* receives an indication from UE 115-*a* of a shared portion of the channel occupancy time), base station 105-*a* may use the shared portion of the channel occupancy time to transmit the downlink traffic indication response 215 (and/or downlink traffic) to UE 115-*a*.

In some aspects, base station 105-*a* may perform an LBT procedure to acquire a transmission opportunity to use for transmitting the downlink traffic indication response 215. For example, base station 105-*a* may determine that an excessive time period has expired since a receiving the downlink traffic query 210 from UE 115-*a*. This may indicate that the transmission opportunity acquired by UE 115-*a* has expired, and therefore base station 105-*a* may perform the LBT procedure to acquire a new transmission opportunity for transmitting the downlink traffic indication response 215.

In some aspects, base station 105-*a* may transmit the downlink traffic indication response 215 over a communication link 205. In some aspects, base station 105-*a* may transmit or otherwise provide the downlink traffic indication response 215 over the unlicensed frequency spectrum band and/or may use a licensed frequency spectrum band to provide the downlink traffic indication response 215. In some aspects, base station 105-*a* may transmit or otherwise provide the downlink traffic indication response 215 using the same RAT as is used for the downlink traffic, or may use a different RAT, e.g., a 5G/NR RAT may be used for the downlink traffic whereas an LTE or Wi-Fi RAT may be used for the downlink traffic indication response 215, or vice versa. In some aspects, base station 105-*a* may transmit or otherwise provide the downlink traffic indication response 215 using a different beamforming configuration than is used for the downlink traffic. For example, the downlink traffic may utilize beamformed transmissions (e.g., in a mmW network) whereas a non-beamformed transmission (e.g., a sub-6 GHz network) may be used for the downlink traffic indication response 215, or vice versa.

Upon receiving the downlink traffic indication response 215 from base station 105-*a*, UE 115-*a* may monitor the unlicensed frequency spectrum band according to the downlink traffic indication response 215. Broadly, this may include UE 115-*a* determining whether to enter a sleep mode and/or determining channel monitoring occasions to monitor the unlicensed frequency spectrum band. For example, UE 115-*a* may identify the downlink traffic schedule indicated in the downlink traffic indication response 215. When the downlink traffic schedule indicates that downlink traffic will be communicated, UE 115-*a* may select a monitoring schedule and/or a monitoring duration to use for monitoring (and receiving) the downlink traffic from base station 105-*a*. When the downlink traffic schedule indicates that there is no downlink traffic being communicated, UE 115-*a* may transition to a sleep mode for a time duration. In some aspects, the time duration may be based on a time period indicated in the downlink traffic indication response 215 in which no downlink traffic will be communicated. UE 115-*a* may transition to an active mode upon termination of the time duration to monitor the unlicensed frequency spectrum band.

Accordingly, UE 115-*a* may conserve power and/or time resources by avoiding continuously monitoring the unlicensed frequency spectrum band when downlink traffic is expected. Instead, UE 115-*a* may proactively and autonomously query base station 105-*a* requesting an update on the downlink traffic schedule for UE 115-*a*. UE 115-*a* may then implement more efficient monitoring procedures according to the downlink traffic schedule.

Figure 3:
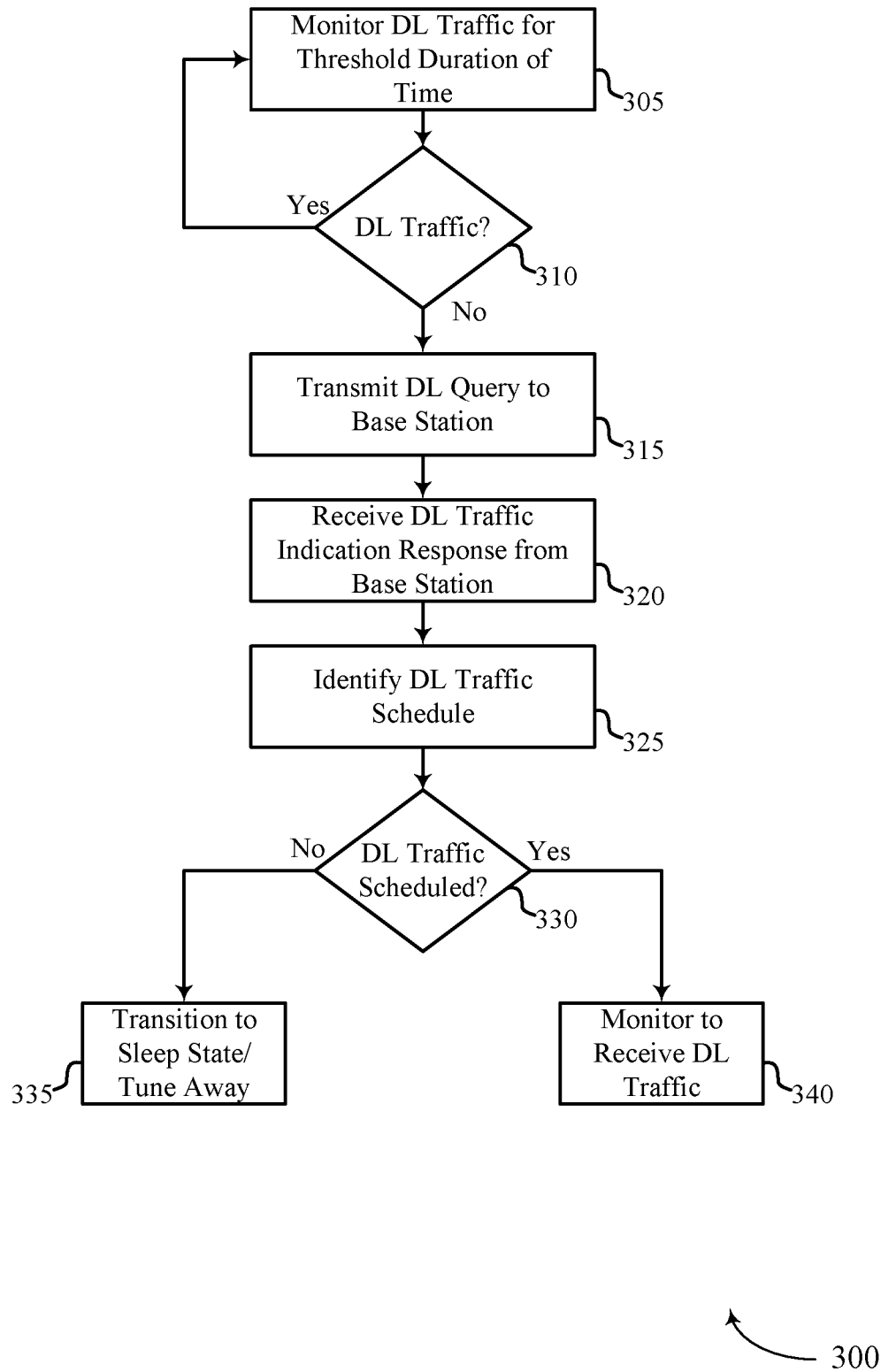
FIG. 3 illustrates an example of a method that supports downlink traffic querying for unlicensed or shared band operation in accordance with aspects of the present disclosure.

FIG. 3 illustrates an example of a method 300 that supports downlink traffic querying for unlicensed or shared band operation in accordance with aspects of the present disclosure. In some examples, method 300 may implement aspects of wireless communication systems 100 and/or 200. Aspects of method 300 may be performed by a base station and/or a UE, which may be examples of corresponding devices described herein. For ease of reference only, the functions of method 300 are described with reference to a UE.

At 305, the UE may monitor an unlicensed frequency spectrum band for downlink traffic from a base station for a threshold duration of time. The UE may expect downlink traffic from the base station within the threshold duration of time based on the type of traffic (e.g., based on the quality of service requirements for ongoing downlink traffic), based on a configured threshold duration of time, and the like.

At 310, the UE may determine whether or not downlink traffic was received from the base station during the threshold duration of time. If downlink traffic is received, the UE may return to 305 and continue monitoring for downlink traffic over the unlicensed frequency spectrum band for the threshold duration of time. In some aspects, the UE may reset a timer corresponding to the threshold duration of time each time the downlink traffic is received.

If no expected downlink traffic is received within the threshold duration of time, at 315 the UE may transmit or otherwise provide an indication of a downlink query to the base station. Generally, the downlink query conveys a request for information regarding the downlink traffic schedule of the UE, e.g., may request an identifier associated with the downlink traffic, such as a virtual channel identifier, a logical channel identifier, and the like. The UE may transmit the downlink traffic query using configured resources or based on an LBT procedure acquiring a transmission opportunity.

At 320, the base station responds by transmitting (and the UE receiving) a downlink traffic indication response that carries or conveys an indication of a downlink traffic schedule for the UE. For example, the downlink traffic schedule may indicate downlink traffic status, downlink traffic window(s), downlink traffic duration(s), and the like, when downlink traffic is scheduled for the UE. Or, the downlink traffic schedule may indicate that there is no downlink traffic scheduled for the UE.

At 325, the UE may identify the downlink traffic schedule received in the downlink traffic indication response from the base station. Accordingly, the UE may identify or otherwise determine whether or not there is downlink traffic scheduled for the UE and, if so, the downlink traffic status, the downlink traffic window, downlink traffic duration, and so forth, for the downlink traffic. Again, the UE may determine that there is no downlink traffic scheduled for it when the downlink traffic schedule indicates no downlink traffic.

At 330, the UE may determine whether or not there is downlink traffic scheduled according to the downlink traffic schedule. For example, the UE may determine or otherwise configure monitoring of the unlicensed frequency spectrum band based at least in part on the downlink traffic indication response.

When there is no downlink traffic scheduled, at 335 the UE may transition to a sleep state for a duration of time to conserve power since there is no downlink traffic scheduled from the base station. In other examples, the UE may leverage the time duration in which no downlink traffic is scheduled to tune away to another channel to address other communication functions. For example, the UE may tune one or more communication channels to another channel to perform wireless communications with a different base station/UE and/or may perform channel monitoring of the other channels to identify candidate channels that can be used for wireless communications.

If there is downlink traffic scheduled, at 340 the UE may monitor the unlicensed frequency spectrum band to receive the downlink traffic. For example, the UE may utilize one or more monitoring occasions in the unlicensed frequency spectrum band to monitor the channel to receive scheduled downlink traffic from the base station.

Figure 4:
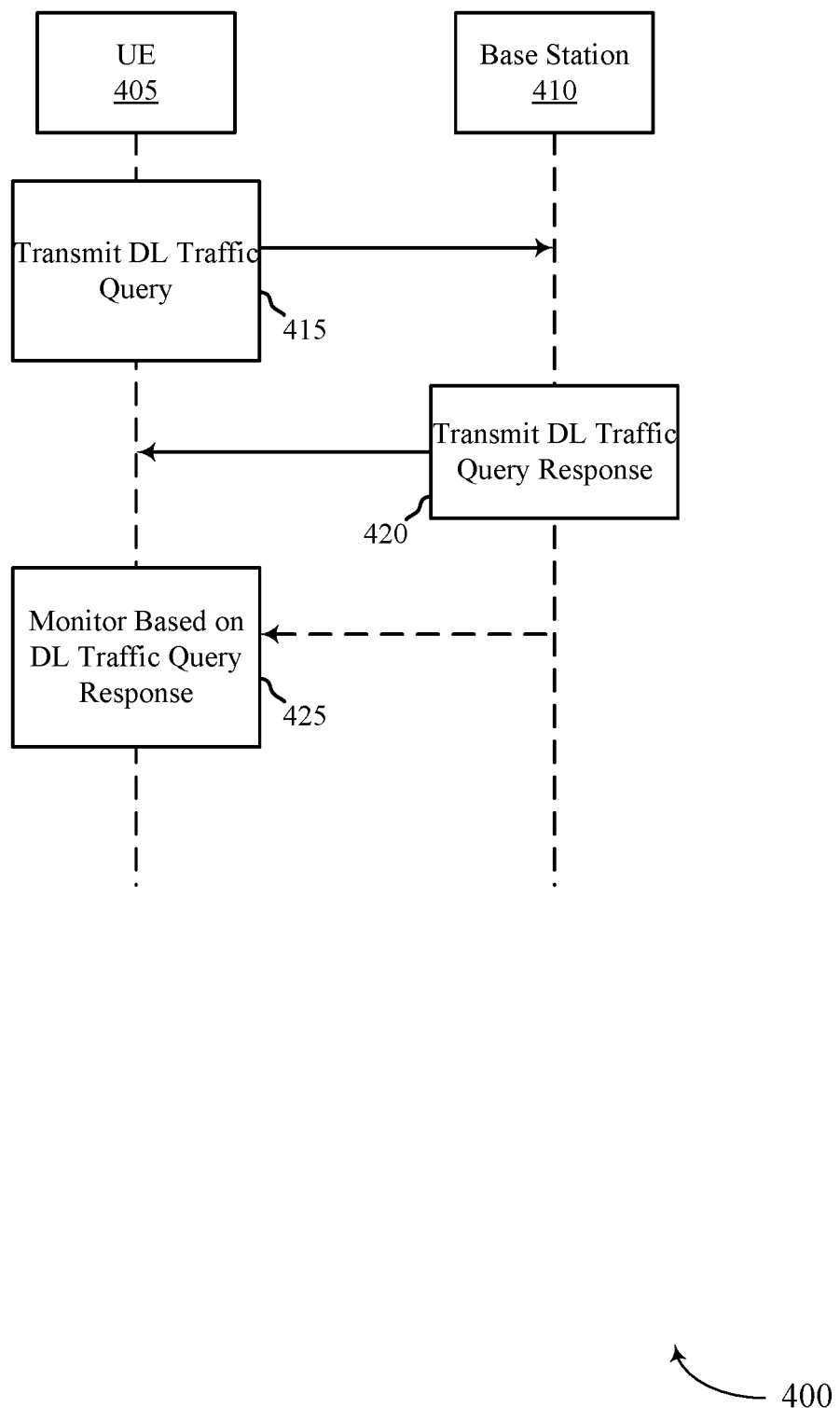
FIG. 4 illustrates an example of a process that supports downlink traffic querying for unlicensed or shared band operation in accordance with aspects of the present disclosure.

FIG. 4 illustrates an example of a process 400 that supports downlink traffic querying for unlicensed or shared band operation in accordance with aspects of the present disclosure. In some examples, process 400 may implement aspects of wireless communication systems 100 and/or 200, and/or method 300. Aspects of process 400 may be implement a by UE 405 and/or base station 410, which may be examples of corresponding devices described herein.

At 415, UE 405 may transmit (and base station 410 may receive) a downlink traffic query based at least in part on an expectation of downlink traffic from base station 410 over an unlicensed frequency spectrum band and an absence of downlink traffic from base station 410 over the unlicensed frequency spectrum band for a threshold duration of time.

In some aspects, this may include UE 405 performing an LBT procedure on the unlicensed frequency spectrum band before transmitting the downlink traffic query to base station 410. The downlink traffic query may be transmitted to base station 410 during a transmission opportunity acquired based at least in part on a successful LBT procedure. In some aspects, UE 405 may share a portion of a channel occupancy time for a channel of the unlicensed frequency band based at least in part on a successful LBT procedure. For example, UE 405 may configure the downlink traffic query to convey an indication of the shared portion of the channel occupancy time acquired during the successful LBT procedure.

In some aspects, this may include UE 405 using configured resources for transmitting the downlink traffic query. For example, UE 405 may be configured with AUL resources, and transmit the downlink traffic query in an AUL transmission. In some aspects, UE 405 may transmit or otherwise provide the downlink traffic query in an uplink control channel transmission, an uplink data channel transmission, an uplink reference signal transmission, a RACH transmission, a scheduling request transmission, a timing adjustment request transmission, an RRC transmission, a MAC CE, and the like.

At 420, base station 410 may transmit (and UE 405 may receive) a downlink traffic indication response based at least in part on the downlink traffic query. In some aspects, this may include base station 410 performing an LBT procedure on the unlicensed frequency spectrum band to acquire a transmission opportunity to use for transmitting the downlink traffic indication response. In some aspects, this may include base station 410 receiving an indication from UE 405 of the shared portion of a channel occupancy time for a channel of the unlicensed frequency spectrum band. Base station 410 may transmit the downlink traffic indication response (and/or downlink traffic) to the UE during or otherwise using the shared portion of the channel acts a time. In some aspects, the downlink traffic indication response may carry or convey an indication of a downlink traffic schedule for UE 405.

At 425, UE 405 may monitor the unlicensed frequency spectrum band based at least in part on the downlink traffic indication response. In some aspects, this may include UE 405 identifying, based at least in part on the downlink traffic indication response, a downlink traffic schedule for UE 405. Accordingly, UE 405 may receive downlink traffic from base station 410 according to the downlink traffic schedule. In some aspects, this may include UE 405 determining that no downlink traffic is scheduled based at least in part on the downlink traffic schedule. Accordingly, UE 405 may transition to a sleep mode for a time duration and then transition to an active mode upon termination of the time duration to monitor the unlicensed frequency spectrum band. In some aspects, this may include UE 405 selecting a monitoring schedule and/or monitoring duration based at least in part on the downlink traffic indication response received from base station 410.

Figure 5:
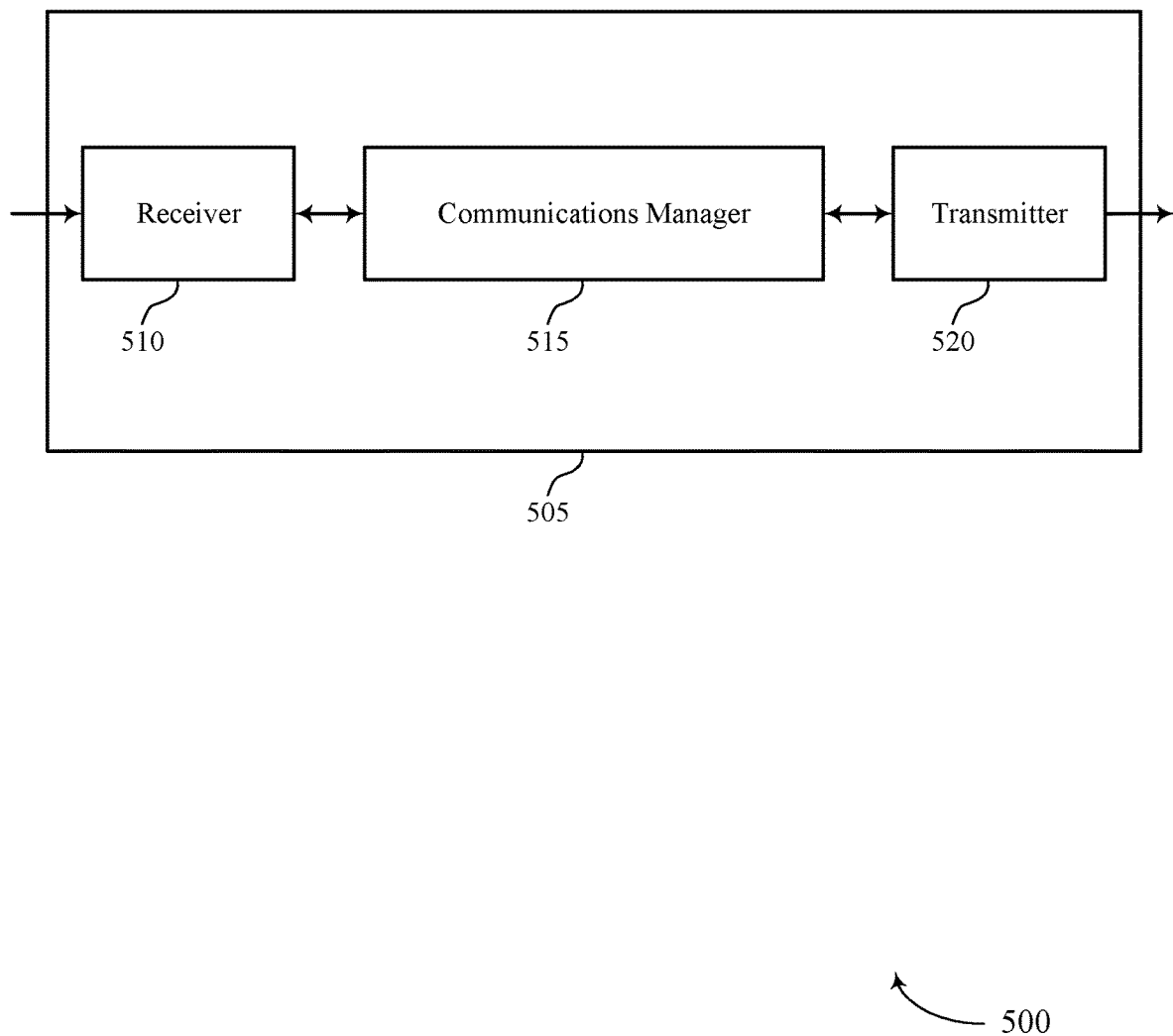
FIGS. 5 and 6 show block diagrams of devices that support downlink traffic querying for unlicensed or shared band operation in accordance with aspects of the present disclosure.

FIG. 5 shows a block diagram 500 of a device 505 that supports downlink traffic querying for unlicensed or shared band operation in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to downlink traffic query for unlicensed or shared band operation, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a downlink traffic query to a base station based on an expectation of downlink traffic from the base station over an unlicensed frequency spectrum band and an absence of downlink traffic from the base station over the unlicensed frequency spectrum band for a threshold duration of time, receive a downlink traffic indication response from the base station based on the downlink traffic query, and monitor the unlicensed frequency spectrum band based on the downlink traffic indication response. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

In some examples, the communications manager 515 may be implemented as an integrated circuit or chipset for a mobile device modem, and the receiver 510 and transmitter 520 may be implemented as analog components (e.g., amplifiers, filters, antennas) coupled with the mobile device modem to enable wireless transmission and reception over one or more bands.

The communications manager 515 as described herein may be implemented to realize one or more potential advantages. One implementation may allow the device to only monitor for downlink traffic during channel monitoring occasions and may enable the device to enter a sleep mode outside of the monitoring occasions, which may result in increased power savings due to lower processing costs. For example, outside of the channel monitoring occasions, the device may enter a sleep mode which may reduce processing and increase efficiency at the device.

Figure 8:
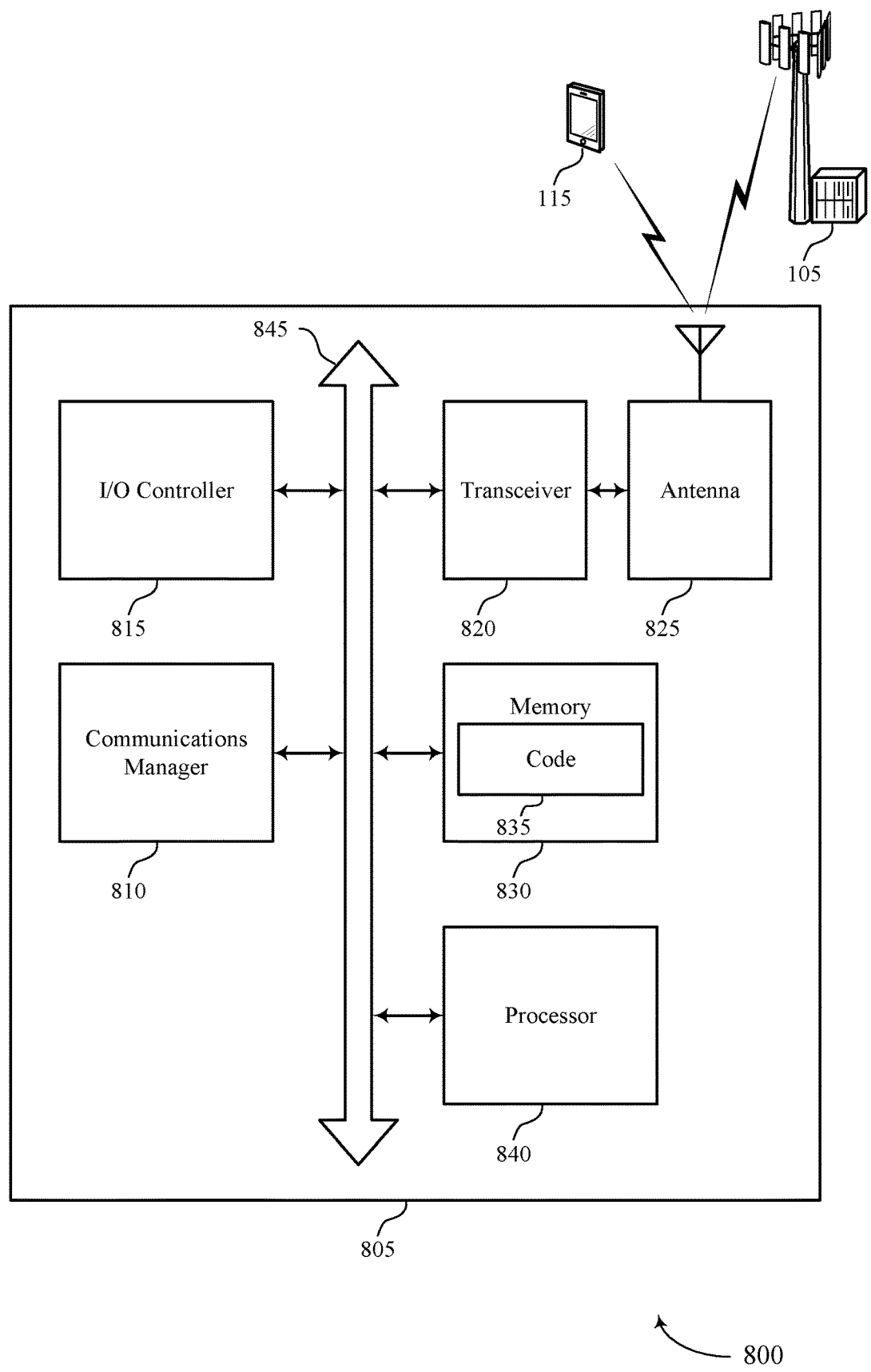
FIG. 8 shows a diagram of a system including a device that supports downlink traffic querying for unlicensed or shared band operation in accordance with aspects of the present disclosure.

Based on techniques for efficiently monitoring occasions when downlink traffic may occur, a processor of a UE 115 (e.g., controlling the receiver 510, the transmitter 520, or a transceiver 820 as described with respect to FIG. 8) may increase system efficiency and decrease unnecessary processing at a device.

Figure 6:
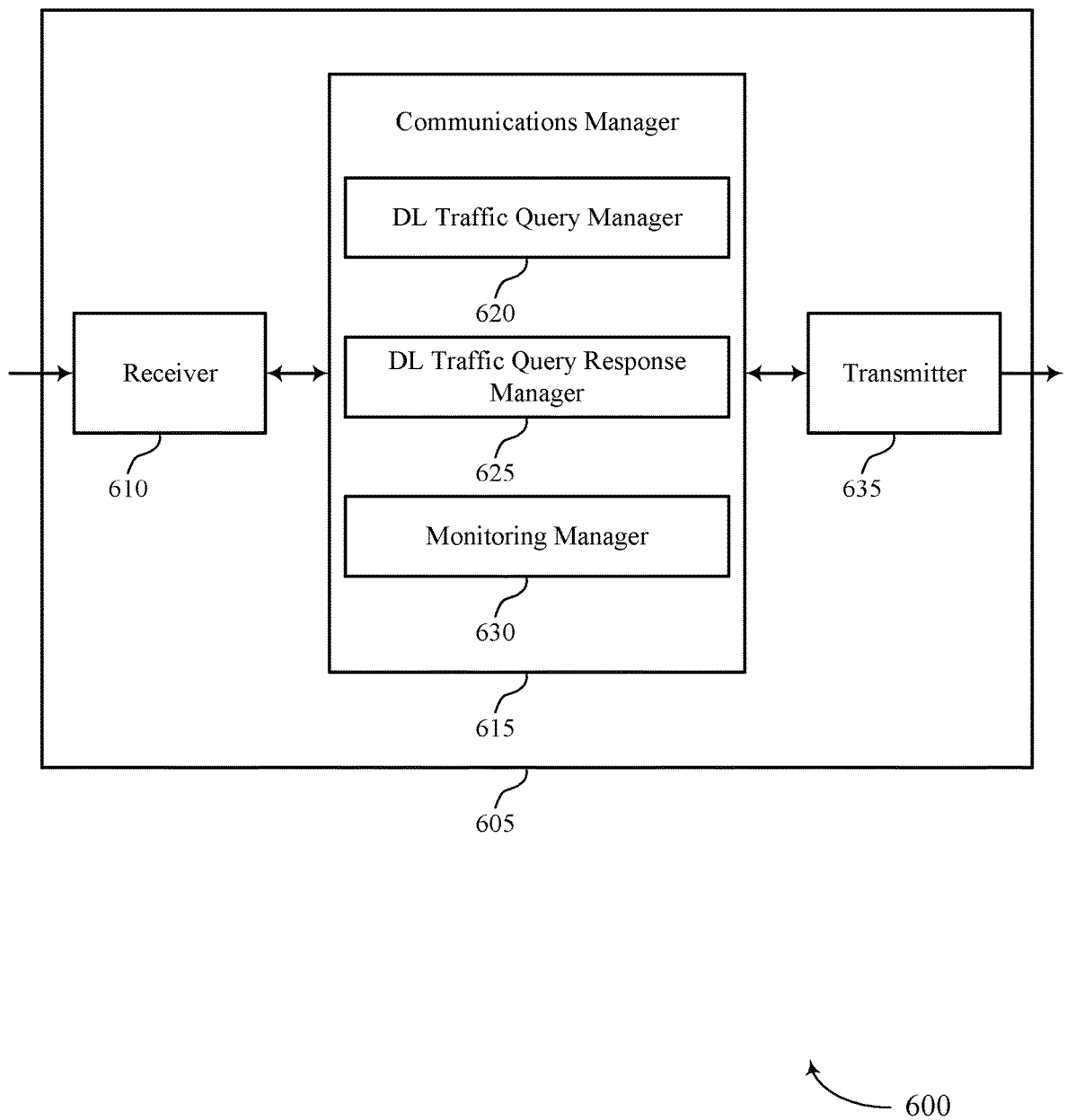

FIG. 6 shows a block diagram 600 of a device 605 that supports downlink traffic querying for unlicensed or shared band operation in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to downlink traffic query for unlicensed or shared band operation, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a downlink (DL) traffic query manager 620, a DL traffic query response manager 625, and a monitoring manager 630. The communications manager 615 may be an example of aspects of the communications manager 810 described herein.

The DL traffic query manager 620 may transmit a downlink traffic query to a base station based on an expectation of downlink traffic from the base station over an unlicensed frequency spectrum band and an absence of downlink traffic from the base station over the unlicensed frequency spectrum band for a threshold duration of time.

The DL traffic query response manager 625 may receive a downlink traffic indication response from the base station based on the downlink traffic query.

The monitoring manager 630 may monitor the unlicensed frequency spectrum band based on the downlink traffic indication response.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
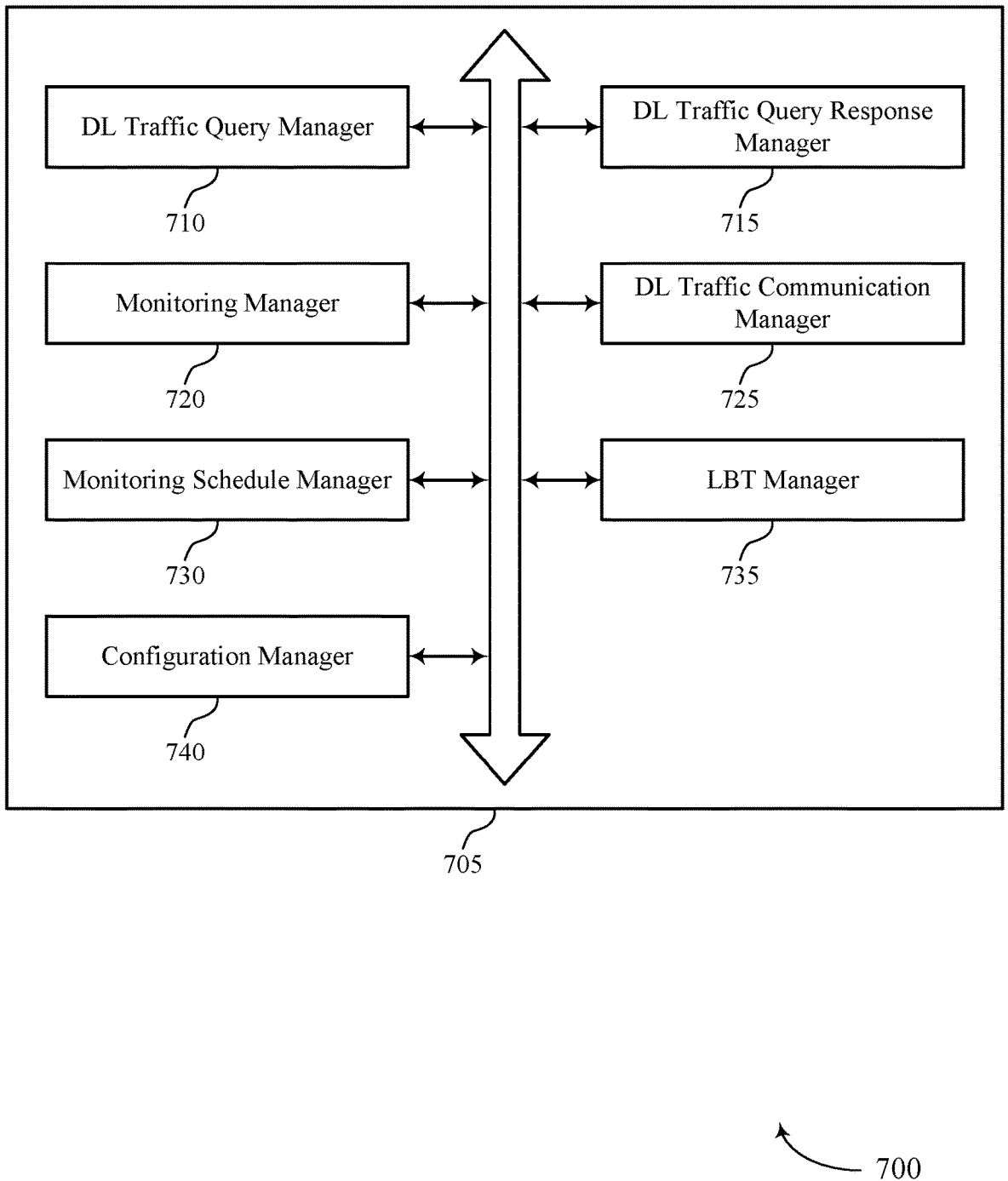
FIG. 7 shows a block diagram of a communications manager that supports downlink traffic querying for unlicensed or shared band operation in accordance with aspects of the present disclosure.

FIG. 7 shows a block diagram 700 of a communications manager 705 that supports downlink traffic querying for unlicensed or shared band operation in accordance with aspects of the present disclosure. The communications manager 705 may be an example of aspects of a communications manager 515, a communications manager 615, or a communications manager 810 described herein. The communications manager 705 may include a DL traffic query manager 710, a DL traffic query response manager 715, a monitoring manager 720, a DL traffic communication manager 725, a monitoring schedule manager 730, an LBT manager 735, and a configuration manager 740. Each of these modules may communicate, directly or indirectly, with one another (e.g., via one or more buses).

The DL traffic query manager 710 may transmit a downlink traffic query to a base station based on an expectation of downlink traffic from the base station over an unlicensed frequency spectrum band and an absence of downlink traffic from the base station over the unlicensed frequency spectrum band for a threshold duration of time.

In some cases, the downlink traffic query is transmitted in one or more of an AUL transmission, an uplink control channel transmission, an uplink data channel transmission, an uplink reference signal transmission, a random access channel transmission, a scheduling request transmission, a timing adjustment request transmission, an RRC transmission, a MAC CE transmission, or a combination thereof. In some cases, the downlink traffic query is transmitted over a licensed frequency spectrum band that is different from the unlicensed frequency spectrum band. In some cases, the downlink traffic query is transmitted over a RAT that is different from the RAT used for downlink traffic received over the unlicensed frequency spectrum band.

The DL traffic query response manager 715 may receive a downlink traffic indication response from the base station based on the downlink traffic query.

The monitoring manager 720 may monitor the unlicensed frequency spectrum band based on the downlink traffic indication response.

The DL traffic communication manager 725 may identify, based on the downlink traffic indication response, a downlink traffic schedule for the UE. In some examples, the DL traffic communication manager 725 may receive downlink traffic from the base station according to the downlink traffic schedule. In some examples, the DL traffic communication manager 725 may transition to a sleep mode for a time duration based on the downlink traffic indication response from the base station. In some examples, the DL traffic communication manager 725 may transition to an active mode upon termination of the time duration to monitor the unlicensed frequency spectrum band. In some cases, the downlink traffic schedule includes one or more of a downlink traffic state, a downlink traffic window, a downlink traffic duration, a data rate for downlink traffic, a scheduling grant for downlink traffic, or a combination thereof.

The monitoring schedule manager 730 may select one or more of a monitoring schedule, a monitoring duration, or a combination thereof, based on the downlink traffic indication response from the base station.

The LBT manager 735 may perform an LBT procedure on the unlicensed frequency spectrum band before transmitting the downlink traffic query to the base station, where the downlink traffic query is transmitted based on a successful LBT procedure. In some examples, the LBT manager 735 may transmit, based on a successful LBT procedure, an indication of a shared portion of a channel occupancy time for a channel of the unlicensed frequency spectrum band. In some examples, the LBT manager 735 may receive downlink traffic scheduled by the base station during the shared portion of the channel occupancy time.

The configuration manager 740 may receive a configuration signal identifying resources for transmitting the downlink traffic query, where the downlink traffic query is transmitted using the identified resources.

FIG. 8 shows a diagram of a system 800 including a device 805 that supports downlink traffic querying for unlicensed or shared band operation in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit a downlink traffic query to a base station based on an expectation of downlink traffic from the base station over an unlicensed frequency spectrum band and an absence of downlink traffic from the base station over the unlicensed frequency spectrum band for a threshold duration of time, receive a downlink traffic indication response from the base station based on the downlink traffic query, and monitor the unlicensed frequency spectrum band based on the downlink traffic indication response.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting downlink traffic query for unlicensed or shared band operation).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
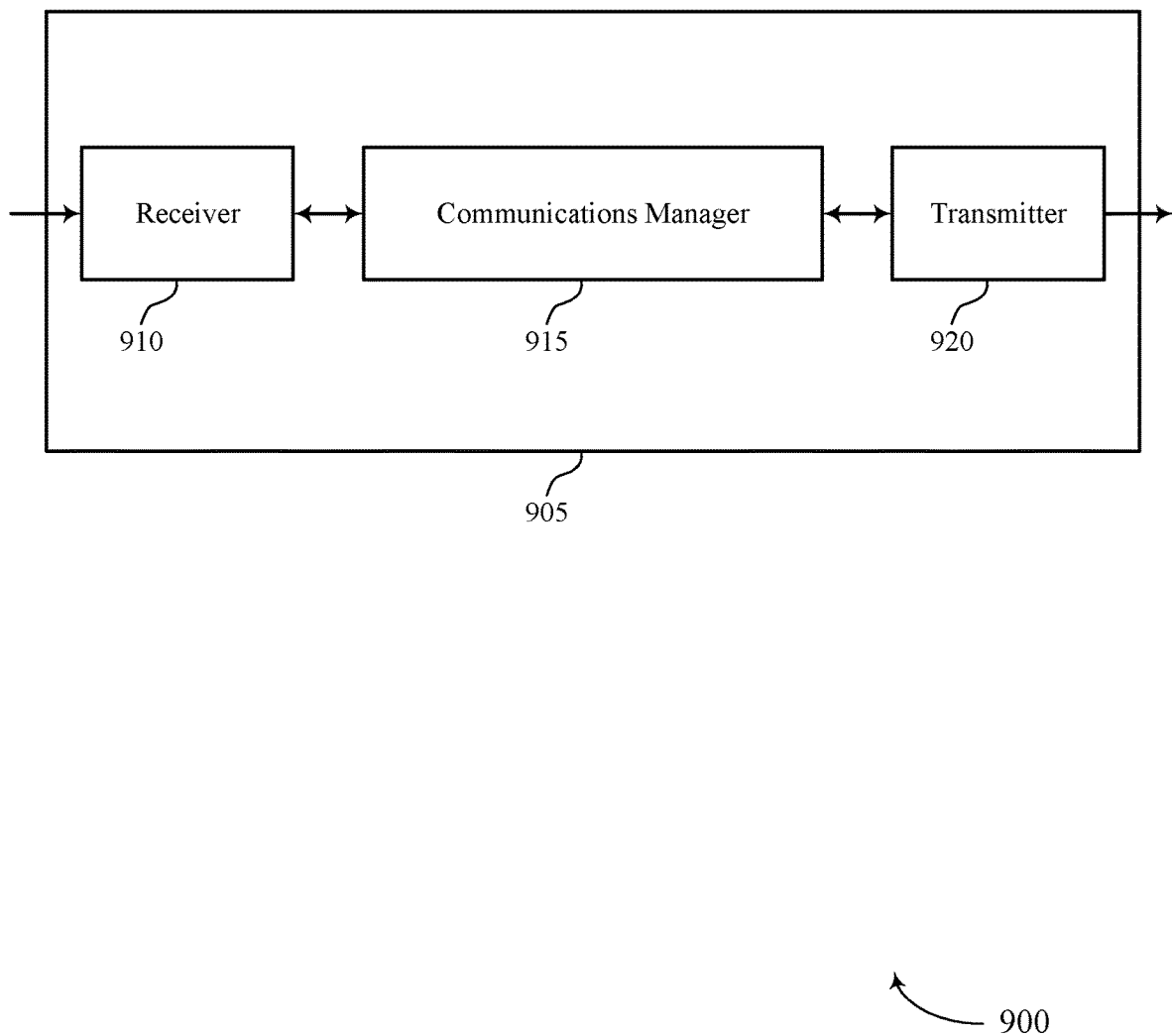
FIGS. 9 and 10 show block diagrams of devices that support downlink traffic querying for unlicensed or shared band operation in accordance with aspects of the present disclosure.

FIG. 9 shows a block diagram 900 of a device 905 that supports downlink traffic querying for unlicensed or shared band operation in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to downlink traffic query for unlicensed or shared band operation, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a downlink traffic query from a UE based on an expectation of downlink traffic from the base station over an unlicensed frequency spectrum band and an absence of downlink traffic from the base station over the unlicensed frequency spectrum band for a threshold duration of time and transmit a downlink traffic indication response to the UE that includes an indication of a downlink traffic schedule for the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
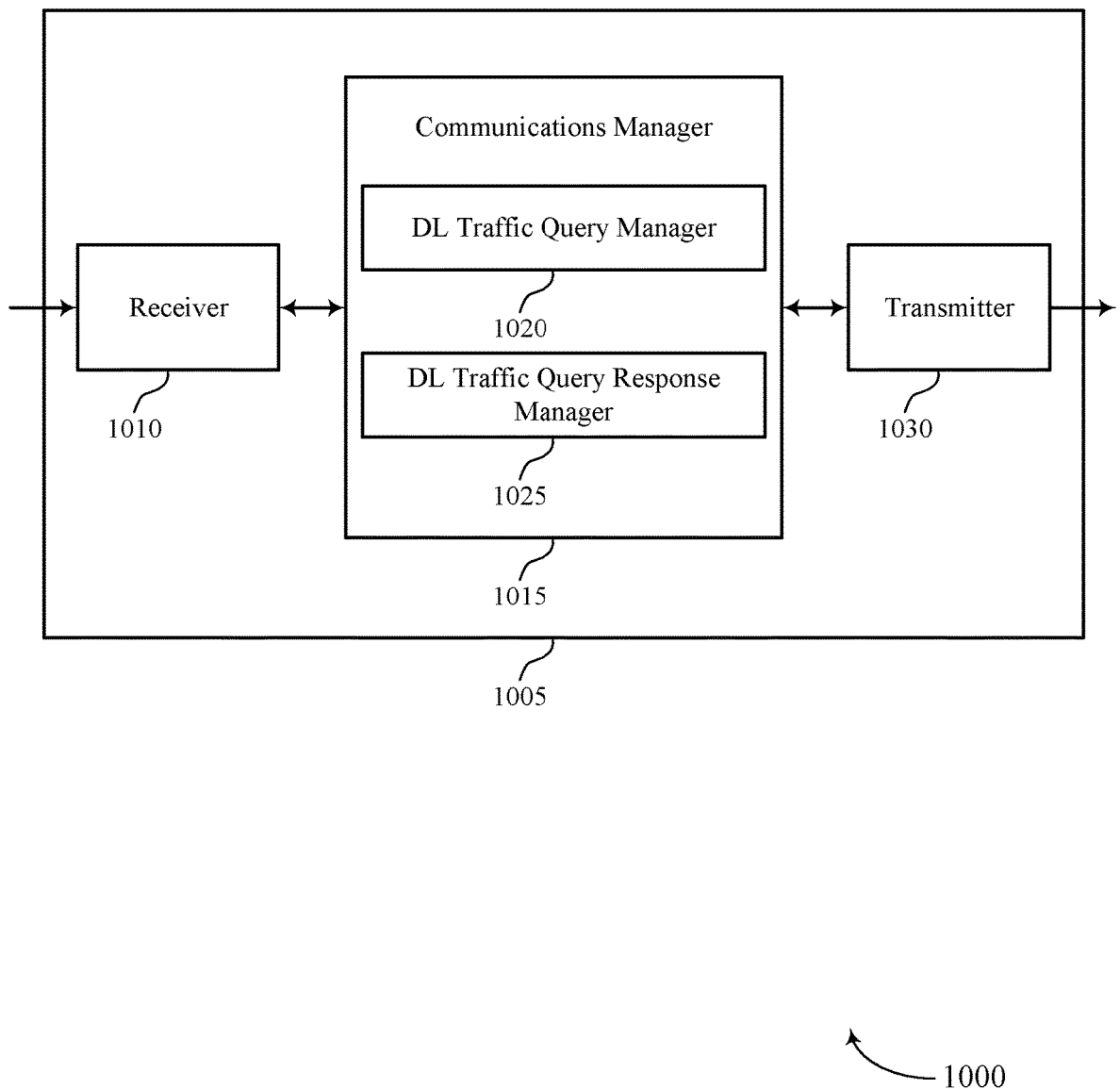

FIG. 10 shows a block diagram 1000 of a device 1005 that supports downlink traffic querying for unlicensed or shared band operation in accordance with aspects of the present disclosure. The device 1005 may be an example of aspects of a device 905, or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to downlink traffic query for unlicensed or shared band operation, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a DL traffic query manager 1020 and a DL traffic query response manager 1025. The communications manager 1015 may be an example of aspects of the communications manager 1210 described herein.

The DL traffic query manager 1020 may receive a downlink traffic query from a UE based on an expectation of downlink traffic from the base station over an unlicensed frequency spectrum band and an absence of downlink traffic from the base station over the unlicensed frequency spectrum band for a threshold duration of time.

The DL traffic query response manager 1025 may transmit a downlink traffic indication response to the UE that includes an indication of a downlink traffic schedule for the UE.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
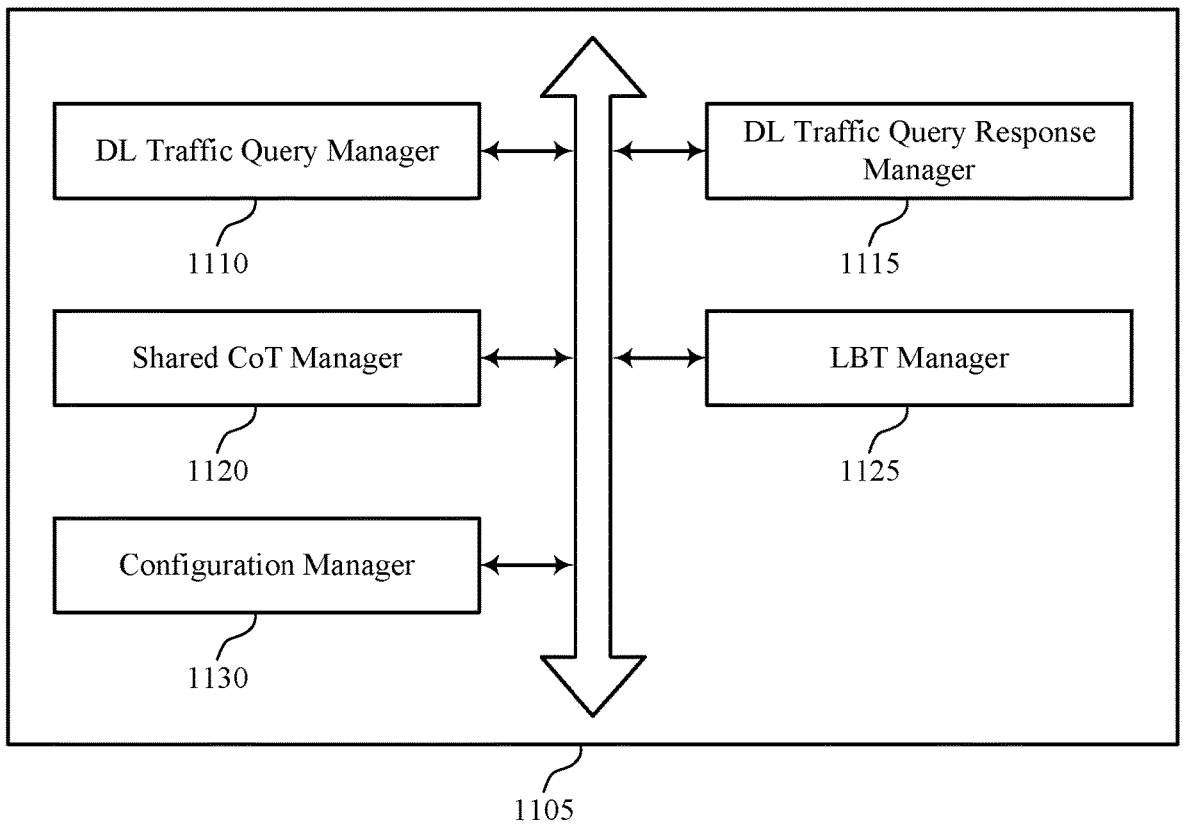
FIG. 11 shows a block diagram of a communications manager that supports downlink traffic querying for unlicensed or shared band operation in accordance with aspects of the present disclosure.

FIG. 11 shows a block diagram 1100 of a communications manager 1105 that supports downlink traffic querying for unlicensed or shared band operation in accordance with aspects of the present disclosure. The communications manager 1105 may be an example of aspects of a communications manager 915, a communications manager 1015, or a communications manager 1210 described herein. The communications manager 1105 may include a DL traffic query manager 1110, a DL traffic query response manager 1115, a shared channel occupancy time (CoT) manager 1120, an LBT manager 1125, and a configuration manager 1130. Each of these modules may communicate, directly or indirectly, with one another (e.g., via one or more buses).

The DL traffic query manager 1110 may receive a downlink traffic query from a UE based on an expectation of downlink traffic from the base station over an unlicensed frequency spectrum band and an absence of downlink traffic from the base station over the unlicensed frequency spectrum band for a threshold duration of time.

In some cases, the downlink traffic query is received in one or more of an AUL transmission, an uplink control channel transmission, an uplink data channel transmission, an uplink reference signal transmission, a random access channel transmission, a scheduling request transmission, a timing adjustment request transmission, an RRC transmission, a MAC CE transmission, or a combination thereof. In some cases, the downlink traffic query is received over a licensed frequency spectrum band that is different from the unlicensed frequency spectrum band. In some cases, the downlink traffic query is received over a RAT that is different from the RAT used for downlink traffic received over the unlicensed frequency spectrum band.

The DL traffic query response manager 1115 may transmit a downlink traffic indication response to the UE that includes an indication of a downlink traffic schedule for the UE. In some cases, the downlink traffic schedule includes one or more of a downlink traffic state, a downlink traffic window, a downlink traffic duration, a data rate for downlink traffic, a scheduling grant for downlink traffic, or a combination thereof.

The shared CoT manager 1120 may receive an indication from the UE of a shared portion of a channel occupancy time for a channel of the unlicensed frequency spectrum band. In some examples, the shared CoT manager 1120 may transmit downlink traffic to the UE during the shared portion of the channel occupancy time.

The LBT manager 1125 may perform a listen-before-talk procedure on the unlicensed frequency spectrum band before transmitting the downlink traffic indication response to the UE.

The configuration manager 1130 may transmit a configuration signal identifying resources for transmitting the downlink traffic query, where the downlink traffic query is received using resources.

Figure 12:
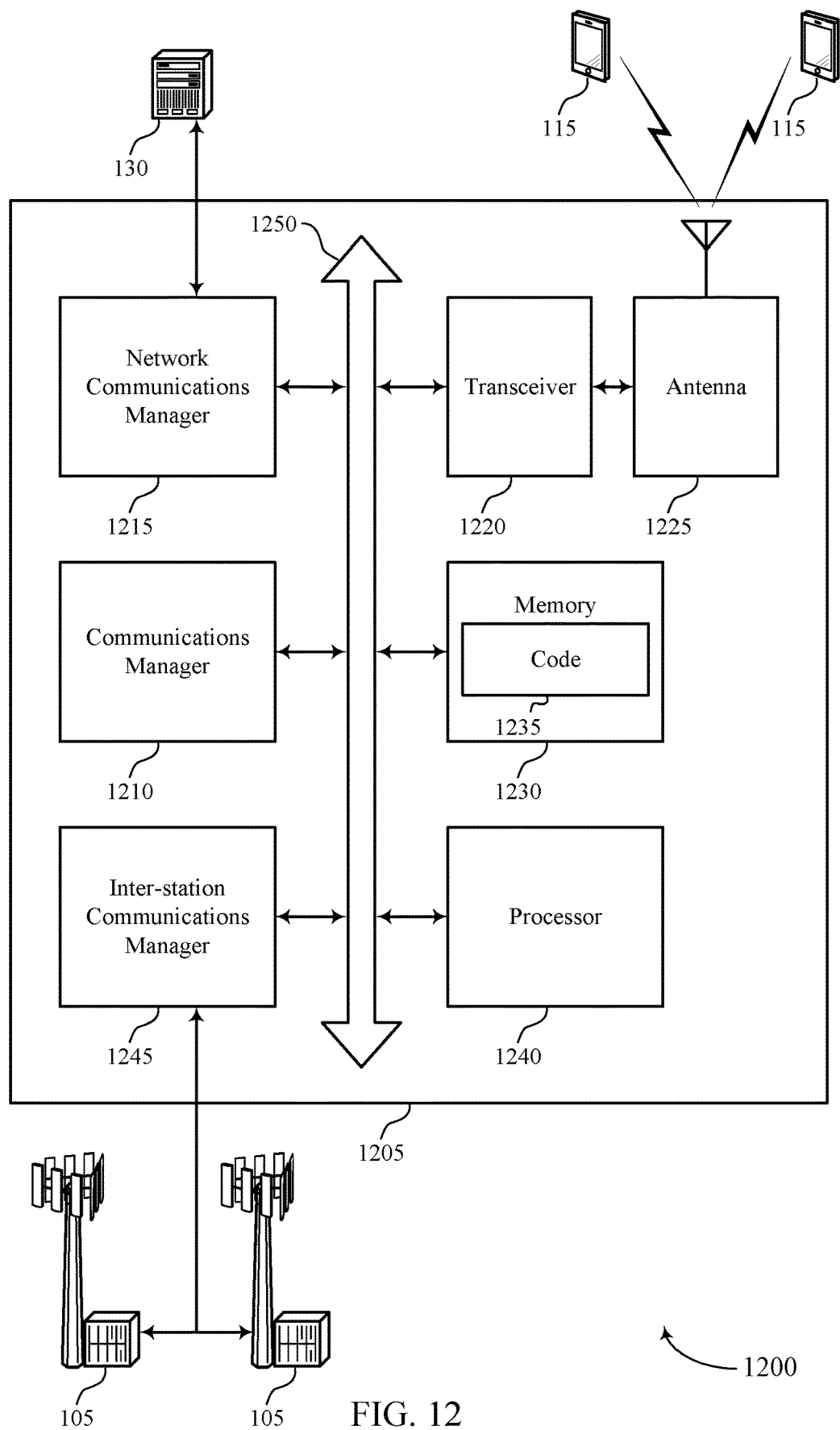
FIG. 12 shows a diagram of a system including a device that supports downlink traffic querying for unlicensed or shared band operation in accordance with aspects of the present disclosure.

FIG. 12 shows a diagram of a system 1200 including a device 1205 that supports downlink traffic querying for unlicensed or shared band operation in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a downlink traffic query from a UE based on an expectation of downlink traffic from the base station over an unlicensed frequency spectrum band and an absence of downlink traffic from the base station over the unlicensed frequency spectrum band for a threshold duration of time and transmit a downlink traffic indication response to the UE that includes an indication of a downlink traffic schedule for the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting downlink traffic query for unlicensed or shared band operation).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
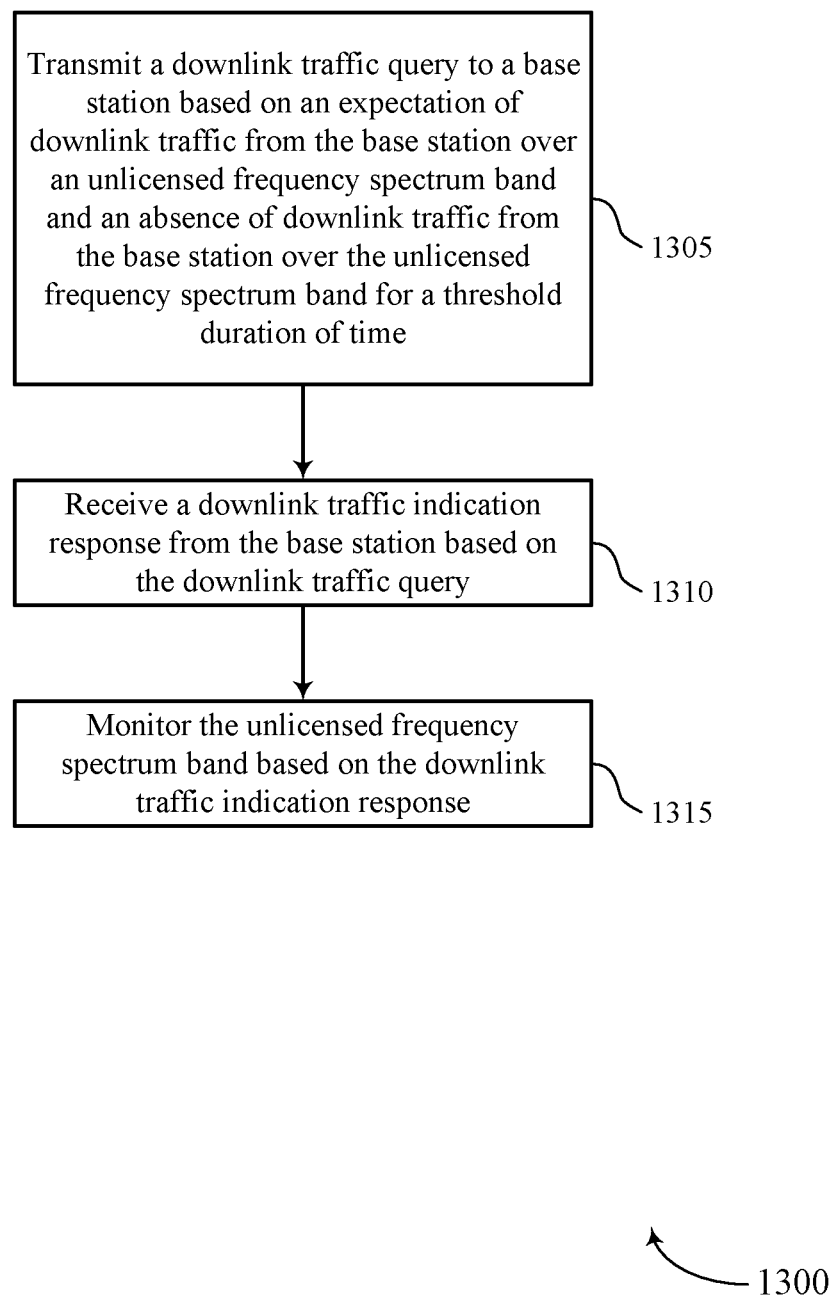
FIGS. 13 through 15 show flowcharts illustrating methods that support downlink traffic querying for unlicensed or shared band operation in accordance with aspects of the present disclosure.

FIG. 13 shows a flowchart illustrating a method 1300 that supports downlink traffic querying for unlicensed or shared band operation in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit a downlink traffic query to a base station based on an expectation of downlink traffic from the base station over an unlicensed frequency spectrum band and an absence of downlink traffic from the base station over the unlicensed frequency spectrum band for a threshold duration of time. The operations of 1305 may be performed according to the methods described herein. In some examples, aspects of the operations of 1305 may be performed by a DL traffic query manager as described with reference to FIGS. 5 through 8.

At 1310, the UE may receive a downlink traffic indication response from the base station based on the downlink traffic query. The operations of 1310 may be performed according to the methods described herein. In some examples, aspects of the operations of 1310 may be performed by a DL traffic query response manager as described with reference to FIGS. 5 through 8.

At 1315, the UE may monitor the unlicensed frequency spectrum band based on the downlink traffic indication response. The operations of 1315 may be performed according to the methods described herein. In some examples, aspects of the operations of 1315 may be performed by a monitoring manager as described with reference to FIGS. 5 through 8.

Figure 14:
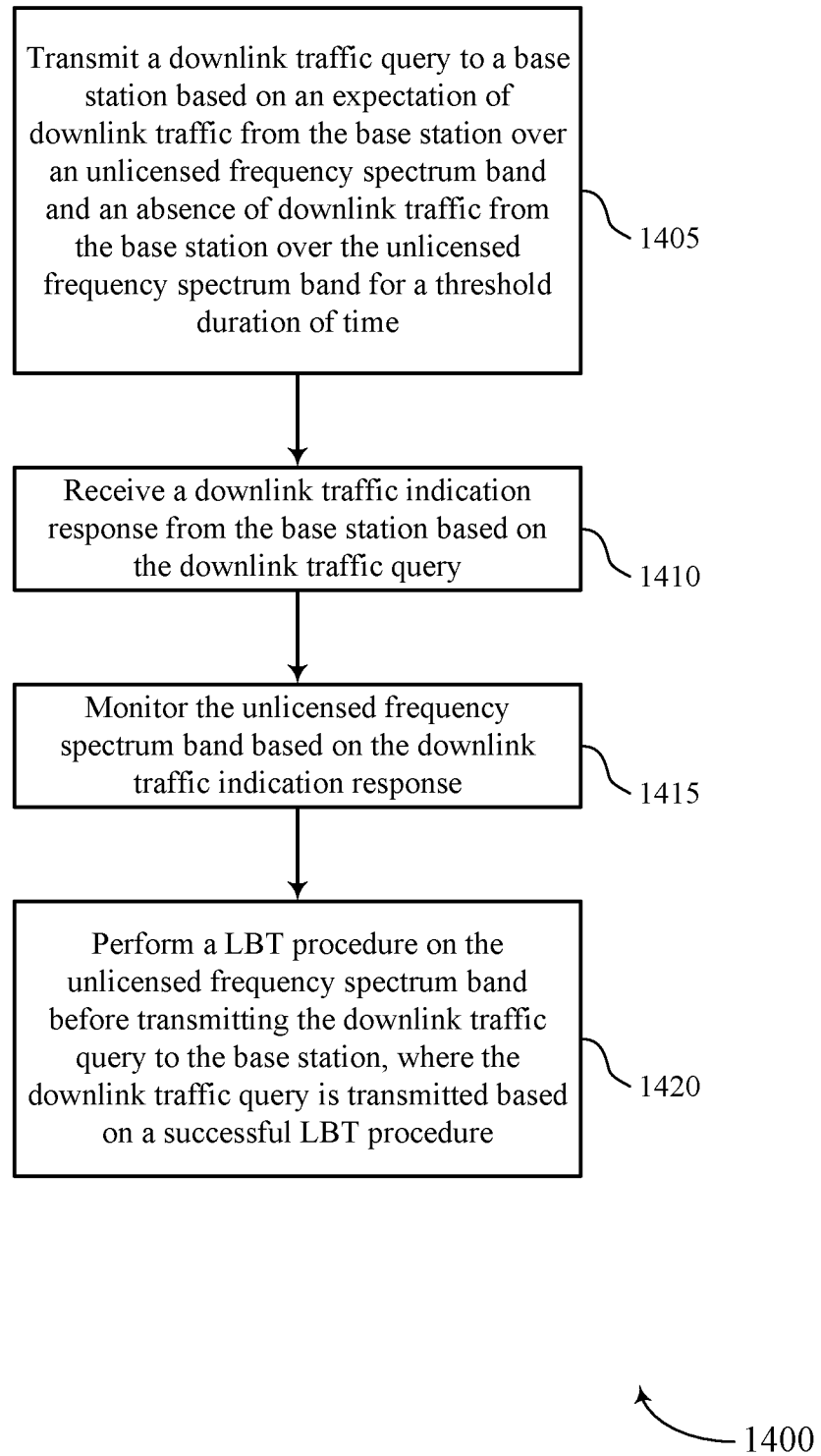

FIG. 14 shows a flowchart illustrating a method 1400 that supports downlink traffic querying for unlicensed or shared band operation in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a downlink traffic query to a base station based on an expectation of downlink traffic from the base station over an unlicensed frequency spectrum band and an absence of downlink traffic from the base station over the unlicensed frequency spectrum band for a threshold duration of time. The operations of 1405 may be performed according to the methods described herein. In some examples, aspects of the operations of 1405 may be performed by a DL traffic query manager as described with reference to FIGS. 5 through 8.

At 1410, the UE may receive a downlink traffic indication response from the base station based on the downlink traffic query. The operations of 1410 may be performed according to the methods described herein. In some examples, aspects of the operations of 1410 may be performed by a DL traffic query response manager as described with reference to FIGS. 5 through 8.

At 1415, the UE may monitor the unlicensed frequency spectrum band based on the downlink traffic indication response. The operations of 1415 may be performed according to the methods described herein. In some examples, aspects of the operations of 1415 may be performed by a monitoring manager as described with reference to FIGS. 5 through 8.

At 1420, the UE may perform an LBT procedure on the unlicensed frequency spectrum band before transmitting the downlink traffic query to the base station, where the downlink traffic query is transmitted based on a successful LBT procedure. The operations of 1420 may be performed according to the methods described herein. In some examples, aspects of the operations of 1420 may be performed by an LBT manager as described with reference to FIGS. 5 through 8.

Figure 15:
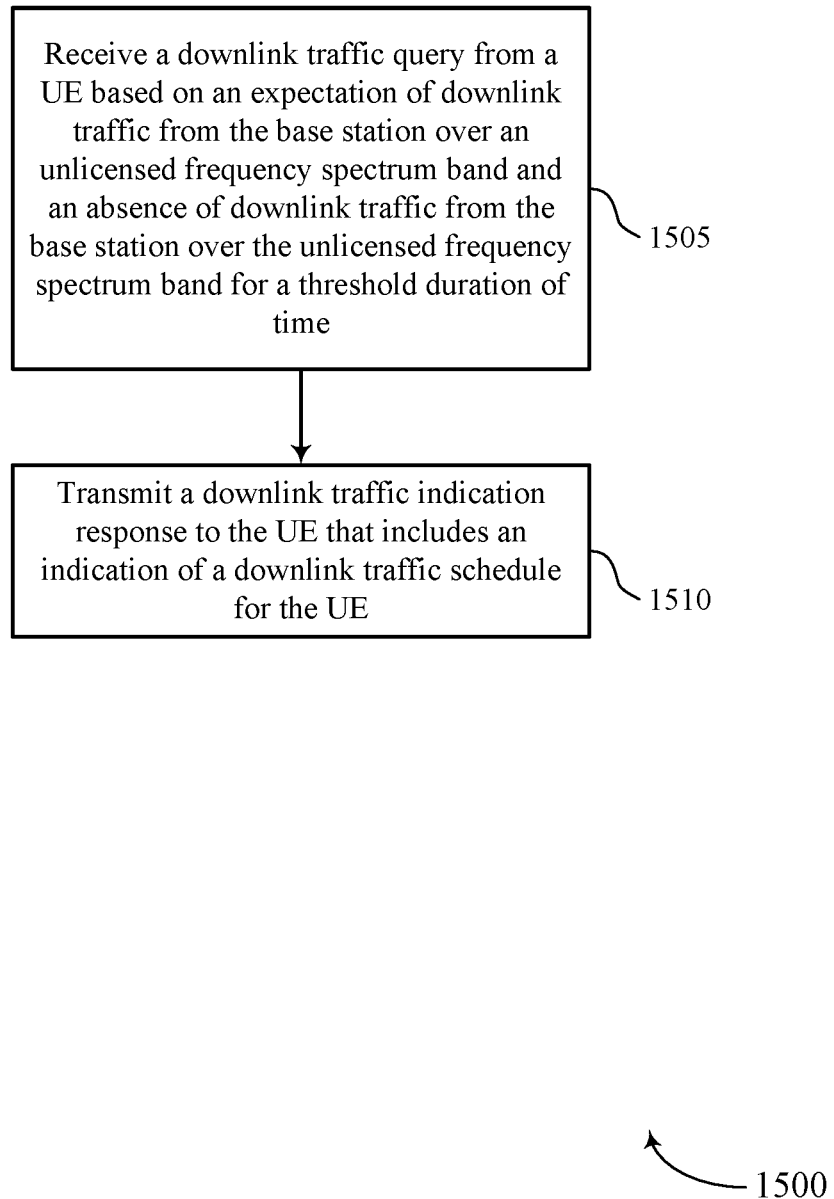

FIG. 15 shows a flowchart illustrating a method 1500 that supports downlink traffic querying for unlicensed or shared band operation in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may receive a downlink traffic query from a UE based on an expectation of downlink traffic from the base station over an unlicensed frequency spectrum band and an absence of downlink traffic from the base station over the unlicensed frequency spectrum band for a threshold duration of time. The operations of 1505 may be performed according to the methods described herein. In some examples, aspects of the operations of 1505 may be performed by a DL traffic query manager as described with reference to FIGS. 9 through 12.

At 1510, the base station may transmit a downlink traffic indication response to the UE that includes an indication of a downlink traffic schedule for the UE. The operations of 1510 may be performed according to the methods described herein. In some examples, aspects of the operations of 1510 may be performed by a DL traffic query response manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting a downlink traffic query to a base station based at least in part on an expectation of downlink traffic from the base station over an unlicensed frequency spectrum band and an absence of downlink traffic from the base station over the unlicensed frequency spectrum band for a threshold duration of time;
   receiving a downlink traffic indication response from the base station based at least in part on the downlink traffic query; and
   monitoring the unlicensed frequency spectrum band based at least in part on the downlink traffic indication response.

2. The method of claim 1, wherein monitoring the unlicensed frequency spectrum band comprises:
   identifying, based at least in part on the downlink traffic indication response, a downlink traffic schedule for the UE; and receiving downlink traffic from the base station according to the downlink traffic schedule.

3. The method of claim 2, wherein the downlink traffic schedule comprises one or more of a downlink traffic state, a downlink traffic window, a downlink traffic duration, a data rate for downlink traffic, a scheduling grant for downlink traffic, or a combination thereof.

4. The method of claim 1, wherein monitoring the unlicensed frequency spectrum band comprises:
transitioning to a sleep mode for a time duration based at least in part on the downlink traffic indication response from the base station; and
transitioning to an active mode upon termination of the time duration to monitor the unlicensed frequency spectrum band.

5. The method of claim 1, wherein monitoring the unlicensed frequency spectrum band comprises:
selecting one or more of a monitoring schedule, a monitoring duration, or a combination thereof, based at least in part on the downlink traffic indication response from the base station.

6. The method of claim 1, further comprising:
performing a listen-before-talk (LBT) procedure on the unlicensed frequency spectrum band before transmitting the downlink traffic query to the base station, wherein the downlink traffic query is transmitted based at least in part on a successful LBT procedure.

7. The method of claim 6, further comprising:
transmitting, based at least in part on a successful LBT procedure, an indication of a shared portion of a channel occupancy time for a channel of the unlicensed frequency spectrum band; and
receiving downlink traffic scheduled by the base station during the shared portion of the channel occupancy time.

8. The method of claim 1, further comprising:
receiving a configuration signal identifying resources for transmitting the downlink traffic query, wherein the downlink traffic query is transmitted using the resources.

9. The method of claim 1, wherein the downlink traffic query is transmitted in one or more of an autonomous uplink (AUL) transmission, an uplink control channel transmission, an uplink data channel transmission, an uplink reference signal transmission, a random access channel transmission, a scheduling request transmission, a timing adjustment request transmission, a radio resource control (RRC) transmission, a medium access control (MAC) control element (CE) transmission, or a combination thereof.

10. The method of claim 1, wherein the downlink traffic query is transmitted over a licensed frequency spectrum band or over a radio access technology (RAT) that is different from the unlicensed frequency spectrum band or different from the RAT used for downlink traffic received over the unlicensed frequency spectrum band.

11. A method for wireless communications at a base station, comprising:
receiving a downlink traffic query from a user equipment (UE) based at least in part on an expectation of downlink traffic from the base station over an unlicensed frequency spectrum band and an absence of downlink traffic from the base station over the unlicensed frequency spectrum band for a threshold duration of time; and
transmitting a downlink traffic indication response to the UE based at least in part on the downlink traffic query, wherein the downlink traffic indication comprises an indication of a downlink traffic schedule for the UE.

12. The method of claim 11, further comprising:
receiving an indication from the UE of a shared portion of a channel occupancy time for a channel of the unlicensed frequency spectrum band; and
transmitting downlink traffic to the UE during the shared portion of the channel occupancy time.

13. The method of claim 11, further comprising:
performing a listen-before-talk procedure on the unlicensed frequency spectrum band before transmitting the downlink traffic indication response to the UE.

14. The method of claim 11, further comprising:
transmitting a configuration signal identifying resources for transmitting the downlink traffic query, wherein the downlink traffic query is received using resources.

15. The method of claim 11, wherein the downlink traffic query is received over a licensed frequency spectrum band or over a radio access technology (RAT) that is different from the unlicensed frequency spectrum band or different from the RAT used for downlink traffic over the unlicensed frequency spectrum band.

16. An apparatus for wireless communications at a user equipment (UE), comprising: a processor; memory in electronic communication with the processor; and instructions stored in the memory, wherein the instructions are executable by the processor to:
transmit a downlink traffic query to a base station based at least in part on an expectation of downlink traffic from the base station over an unlicensed frequency spectrum band and an absence of downlink traffic from the base station over the unlicensed frequency spectrum band for a threshold duration of time;
receive a downlink traffic indication response from the base station based at least in part on the downlink traffic query; and
monitor the unlicensed frequency spectrum band based at least in part on the downlink traffic indication response.

17. The apparatus of claim 16, wherein the instructions executable by the processor to monitor the unlicensed frequency spectrum band comprise instructions executable by the processor to:
identify, based at least in part on the downlink traffic indication response, a downlink traffic schedule for the UE; and
receive downlink traffic from the base station according to the downlink traffic schedule.

18. The apparatus of claim 17, wherein the downlink traffic schedule comprises one or more of a downlink traffic state, a downlink traffic window, a downlink traffic duration, a data rate for downlink traffic, a scheduling grant for downlink traffic, or a combination thereof.

19. The apparatus of claim 16, wherein the instructions executable by the processor to monitor the unlicensed frequency spectrum band comprise instructions executable by the processor to:
transition to a sleep mode for a time duration based at least in part on the downlink traffic indication response from the base station; and
transition to an active mode upon termination of the time duration to monitor the unlicensed frequency spectrum band.

20. The apparatus of claim 16, wherein the instructions executable by the processor to monitor the unlicensed frequency spectrum band comprise instructions executable by the processor to:

select one or more of a monitoring schedule, a monitoring duration, or a combination thereof, based at least in part on the downlink traffic indication response from the base station.

21. The apparatus of claim 16, wherein the instructions are further executable by the processor to:
perform a listen-before-talk (LBT) procedure on the unlicensed frequency spectrum band before transmitting the downlink traffic query to the base station, wherein the downlink traffic query is transmitted based at least in part on a successful LBT procedure.

22. The apparatus of claim 21, wherein the instructions are further executable by the processor to:
transmit, based at least in part on a successful LBT procedure, an indication of a shared portion of a channel occupancy time for a channel of the unlicensed frequency spectrum band; and
receive downlink traffic scheduled by the base station during the shared portion of the channel occupancy time.

23. The apparatus of claim 16, wherein the instructions are further executable by the processor to:
receive a configuration signal identifying resources for transmitting the downlink traffic query, wherein the downlink traffic query is transmitted using resources.

24. The apparatus of claim 16, wherein the downlink traffic query is transmitted in one or more of an autonomous uplink (AUL) transmission, an uplink control channel transmission, an uplink data channel transmission, an uplink reference signal transmission, a random access channel transmission, a scheduling request transmission, a timing adjustment request transmission, a radio resource control (RRC) transmission, a medium access control (MAC) control element (CE) transmission, or a combination thereof.

25. The apparatus of claim 16, wherein the downlink traffic query is transmitted over a licensed frequency spectrum band or over a radio access technology (RAT) that is different from the unlicensed frequency spectrum band or different from the RAT used for downlink traffic received over the unlicensed frequency spectrum band.

26. An apparatus for wireless communications at a base station, comprising: a processor, memory in electronic communication with the processor; and instructions stored in the memory, wherein the instructions are executable by the processor to:
receive a downlink traffic query from a user equipment (UE) based at least in part on an expectation of downlink traffic from the base station over an unlicensed frequency spectrum band and an absence of downlink traffic from the base station over the unlicensed frequency spectrum band for a threshold duration of time; and
transmit a downlink traffic indication response to the UE based at least in part on the downlink traffic query, wherein the downlink traffic indication comprises an indication of a downlink traffic schedule for the UE.

27. The apparatus of claim 26, wherein the instructions are further executable by the processor to:
receive an indication from the UE of a shared portion of a channel occupancy time for a channel of the unlicensed frequency spectrum band; and
transmit downlink traffic to the UE during the shared portion of the channel occupancy time.

28. The apparatus of claim 26, wherein the instructions are further executable by the processor to:
perform a listen-before-talk procedure on the unlicensed frequency spectrum band before transmitting the downlink traffic indication response to the UE.

29. The apparatus of claim 26, wherein the instructions are further executable by the processor to:
transmit a configuration signal identifying resources for transmitting the downlink traffic query, wherein the downlink traffic query is received using resources.

30. The apparatus of claim 26, wherein the downlink traffic query is received over a licensed frequency spectrum band or over a radio access technology (RAT) that is different from the unlicensed frequency spectrum band or different from the RAT used for downlink traffic received over the unlicensed frequency spectrum band.

* * * * *